United States Patent
Muniswamy-Reddy et al.

(10) Patent No.: US 9,489,443 B1
(45) Date of Patent: Nov. 8, 2016

(54) SCHEDULING OF SPLITS AND MOVES OF DATABASE PARTITIONS

(71) Applicant: Amazon Technologies, Inc., Reno, NV (US)

(72) Inventors: Kiran-Kumar Muniswamy-Reddy, Seattle, WA (US); Wei Xiao, Kirkland, WA (US); Stefano Stefani, Issaquah, WA (US); Xianglong Huang, Bellevue, WA (US); Clarence Wing Yin Ng, Daly City, CA (US); Jai Vasanth, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 66 days.

(21) Appl. No.: 13/902,419

(22) Filed: May 24, 2013

(51) Int. Cl.
   *G06F 17/30* (2006.01)

(52) U.S. Cl.
   CPC .............................. *G06F 17/30584* (2013.01)

(58) Field of Classification Search
   None
   See application file for complete search history.

(56) References Cited

U.S. PATENT DOCUMENTS

| | | | |
|---|---|---|---|
| 6,105,026 A * | 8/2000 | Kruglikov et al. | |
| 7,685,109 B1 * | 3/2010 | Ransil et al. | 707/999.003 |
| RE42,664 E * | 8/2011 | Hallmark et al. | 707/636 |
| 8,732,517 B1 * | 5/2014 | Stefani et al. | 714/4.1 |
| 8,805,784 B2 * | 8/2014 | Novik et al. | 707/633 |
| 2003/0115206 A1 | 6/2003 | Gilbert | |
| 2004/0111726 A1 * | 6/2004 | Dilley, Jr. | G06F 17/303 719/310 |
| 2007/0168336 A1 | 7/2007 | Ransil et al. | |
| 2008/0256029 A1 * | 10/2008 | Abrink | 707/2 |
| 2009/0089772 A1 * | 4/2009 | Di Balsamo | G06F 9/5038 717/168 |
| 2010/0030793 A1 * | 2/2010 | Cooper et al. | 707/100 |
| 2011/0099146 A1 | 4/2011 | Mcalister et al. | |
| 2011/0178985 A1 * | 7/2011 | San Martin Arribas | G06F 17/30584 707/636 |
| 2011/0282832 A1 * | 11/2011 | Rishel et al. | 707/609 |
| 2011/0302583 A1 | 12/2011 | Abadi et al. | |
| 2012/0254175 A1 | 10/2012 | Horowitz et al. | |
| 2012/0330954 A1 | 12/2012 | Sivasubramanian et al. | |
| 2013/0204917 A1 * | 8/2013 | Wang et al. | 709/201 |
| 2013/0204990 A1 * | 8/2013 | Skjolsvold et al. | 709/223 |
| 2013/0204991 A1 * | 8/2013 | Skjolsvold et al. | 709/223 |
| 2013/0238676 A1 * | 9/2013 | Zha | G06F 17/30557 707/827 |
| 2014/0007124 A1 * | 1/2014 | Ashok et al. | 718/104 |
| 2014/0129958 A1 * | 5/2014 | Garza et al. | 715/748 |
| 2014/0245311 A1 * | 8/2014 | Dodge | G06F 9/50 718/103 |

* cited by examiner

*Primary Examiner* — James Trujillo
*Assistant Examiner* — Aida Tessema
(74) *Attorney, Agent, or Firm* — Robert C. Kowert; Meyertons, Hood, Kivlin, Kowert & Goetzel, P.C.

(57) ABSTRACT

A system that implements a data storage service may store data in multiple replicated partitions on respective computing nodes on behalf of clients. A storage node may, based on the amount of provisioned resources on a given storage device or logical volume, identify candidate partition management operations to be performed, and may send information about the operations to a central partition management scheduler. The scheduler may apply a global prioritization scheme to determine an order in which to perform the candidate operations. The order may be based on whether the operations include partition splits or partition moves, whether they aim to reduce provisioned storage capacity or reduce throughput capacity on a storage device or logical volume, whether they conflict with each other, whether the total number of partitions (or replicas thereof) involved in partition management at any given time exceeds a pre-determined limit, or whether they were requested by clients.

20 Claims, 16 Drawing Sheets

SCHEDULING OF SPLITS AND MOVES OF DATABASE PARTITIONS

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool. If a partition gets too large, it may be split into smaller partitions (each stored on a different machine) or moved to another machine.

Interaction between client applications and database servers typically includes read operations (read-only queries), write operations (to store data), and update operations that can be conceptualized using a read-modify-write workflow.

Figure 1:
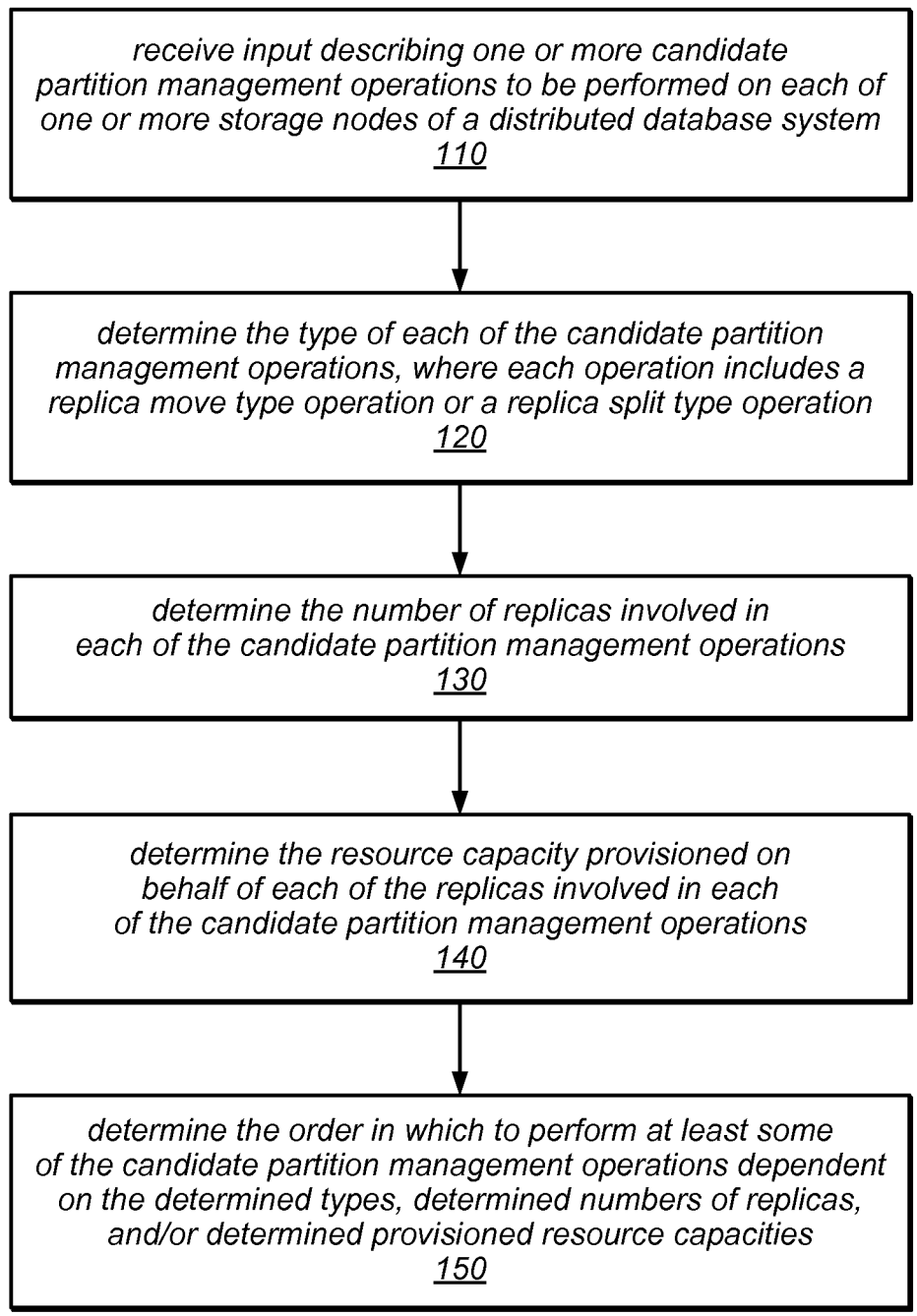
FIG. 1 is a flow diagram illustrating one embodiment of a method for scheduling partition management operations, from the perspective of a central partition management scheduler.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement a Web-based service that provides data storage services to storage service clients (e.g., user, subscribers, or client applications that access the data storage service on behalf of users or subscribers). The service may in some embodiments support the seamless scaling of tables that are maintained on behalf of clients in a non-relational data store, e.g., a non-relational database. The service may provide a high level of durability and availability through replication, in some embodiments.

In some embodiments, the service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the service may in some embodiments initiate the re-sizing (scaling) and/or repartitioning of a table programmatically in response to receiving one or more requests to store, retrieve, modify, or delete items in the scalable table. In some embodiments, a table may be repartitioned in response to crossing a pre-determined maximum threshold for the amount or percentage of resources (e.g., storage resource capacity or throughput capacity) that are provisioned to implement various tables, partitions, and replicas on the storage devices (or logical volumes) of a storage node. As used herein, the term "repartitioning" may be used to describe any of a variety of types of partition management operations, in different embodiments. For example, repartitioning a table may include splitting a partition (or one or more replicas of a partition) into multiple smaller partitions and/or moving one or more partitions (or replicas thereof) from one storage node (or storage device) to a different storage node (or storage device).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In various embodiments, systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments, a partition replica may be assigned to a particular storage node based largely (or solely) on whether there is enough storage capacity for the anticipated size of the table. For example, the anticipated size may be based on information included in a request to create the table, on usage history for the client on whose behalf the table was created, or on a history of accesses that target the table, the partition, or the replica itself (e.g., if this is a partition replica that is being reassigned as part of a move operation). In such embodiments, there may or may not be enough throughput capacity for the partition replica on the selected storage node (or storage device thereof). For example, a disk to which the partition replica is assigned may be oversubscribed in terms of IOPS, the actual number of IOPS may be more than was expected, or the provisioned (or committed) number of IOPS may have grown after the partition replica was created (e.g., using an UpdateTable operation to increase the provisioned throughput capacity for read operations and/or write operations). In some embodiments, an UpdateTable operation may be invoked by a client through a graphical user interface (GUI). In other embodiments, an UpdateTable operation may be invoked through an UpdateTable API whose inputs include an identifier of the table for which additional throughput capacity is desired, a desired (e.g., increased) number of IOPS for read operations and/or a desired (e.g., increased) number of IOPS for write operations. In some or all of these cases, the partition replica may need to be moved to another storage node (or storage device) or split into two new (smaller) partitions, each of which may be hosted on a different storage device (or storage node).

Note that while several techniques for identifying candidate partition management operations and/or determining an order in which to perform them are described herein in terms of splitting or moving replicas of various database table partitions, these techniques may be more generally applicable in any situation and/or at any time in which a re-sizeable collection of data (e.g., a collection of data for which a variable amount of storage, throughput, or other resources may be provisioned and/or consumed over time) is stored in a distributed data storage system.

As described in more detail herein, moving a partition replica may involve creating one or more copies of a partition (or partition replica) on respective storage nodes (or storage devices thereof) and then redirecting at least some of the subsequent requests that target the partition to the new copy (or copies). Note that in some embodiments, an operation to split a partition may consume more resources than an operation to move a partition of similar size. For example, in some embodiments, splitting a partition into two new partitions may include duplicating all of the replicas of the partition (i.e., doubling the number of replicas), and then dividing each of them in half. In other words, an operation to split a partition may affect all of the replicas in the replica group and an additional complete set of replicas (at least until the split operation is completed).

In some embodiments of the distributed database systems described herein, each storage node may include multiple storage devices or logical volumes, each of which stores various partition replicas. For example, in one embodiment each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partitions, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

In some embodiments, once a storage node has identified a candidate partition management operation to be performed locally, it may send information about the candidate operation to a central partition management scheduler. The central partition management scheduler may apply a global prioritization scheme across all candidate partition management operations to be performed on all of the storage nodes in the distributed database system to determine the order (or relative order) in which at least some of them should be performed. In some embodiments, the order in which the candidate partition management operations are scheduled for execution may be dependent on whether they involve partition splitting operations or partition moving operations, among other things. For example, partition splitting operations may be prioritized over partition moving operations, in some embodiments.

One embodiment of a method for scheduling partition management operations, from the perspective of a central partition management scheduler, is illustrated by the flow diagram in FIG. 1. As illustrated at 110, in this example, the method may include receiving input describing one or more candidate partition management operations to be performed on each of one or more storage nodes of a distributed database system. The method may include determining the type of each of the candidate partition management operations, as in 120, where each operation includes a replica move type operation or a replica split type operation. The method may also include determining the number of partition replicas that would be involved in each of the candidate partition management operations, as in 130.

As illustrated in this example, the method may include determining the resource capacity that has been provisioned on behalf of each of the replicas involved in each of the candidate partition management operations, as in 140. And determining the order in which to perform at least some of the candidate partition management operations dependent on the determined partition management operation types, the determined numbers of replicas that would be involved in various ones of the candidate partition management operations, and/or the determined amounts of resource capacity that were provisioned for the replicas that would be involved in various ones of the candidate partition management operations 150. Examples of specific global prioritization policies for determining the order in which the candidate partition management operations would be scheduled for execution are described in more detail below.

Figure 2:
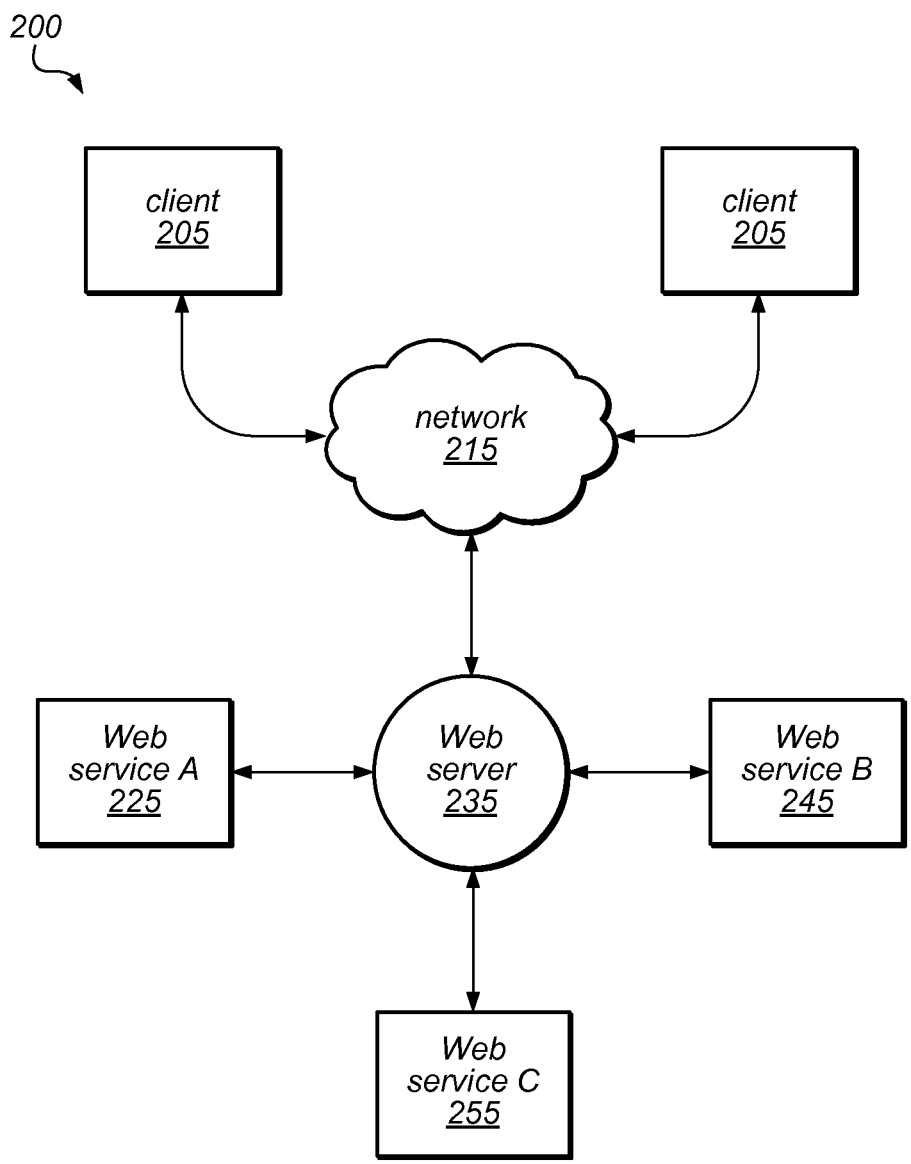
FIG. 2 is a block diagram illustrating one embodiment of a system that provides various Web-based services to clients.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of: computational resources, database services, data storage services (e.g., maintaining data in one or more tables on behalf of a client), or any other types of services or shared resources.

Figure 3:
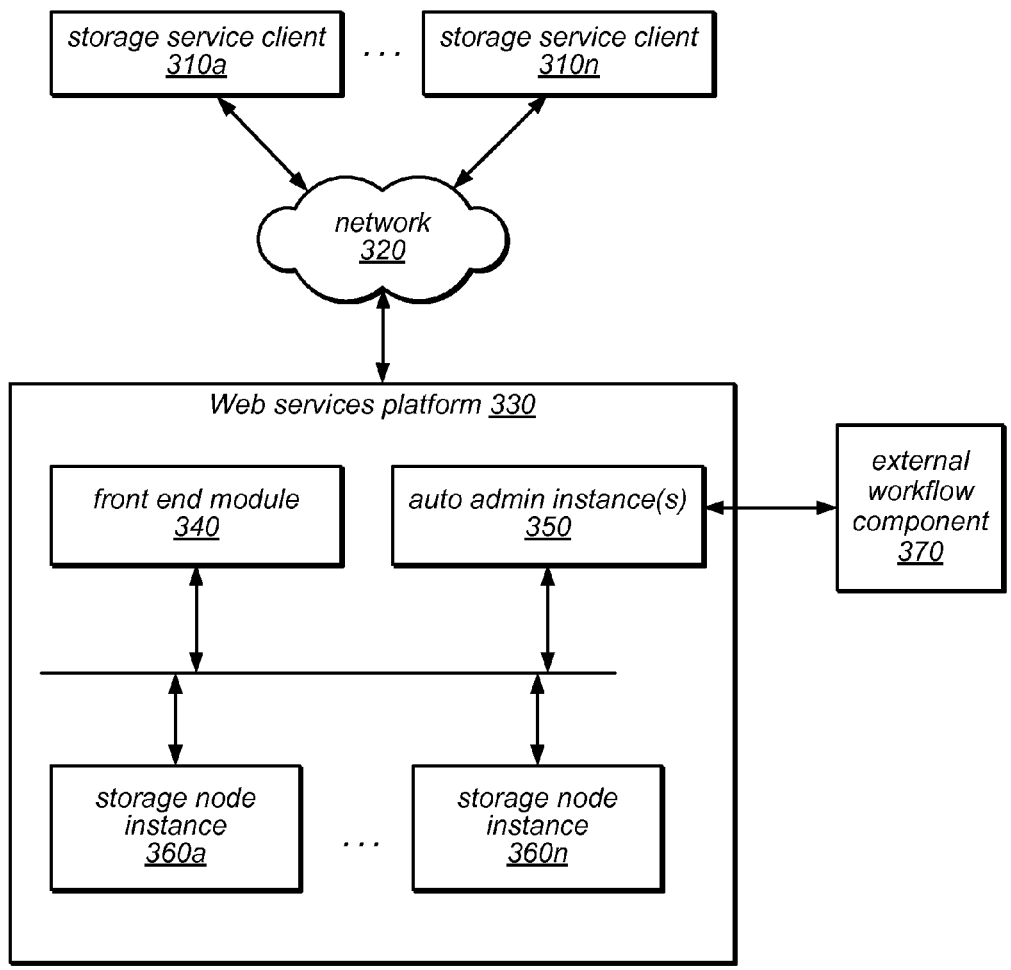
FIG. 3 is a block diagram illustrating one embodiment of a system architecture that is configured to implement a Web services-based data storage service.

One embodiment of a system architecture that is configured to implement a Web services-based data storage service such as that described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computing node illustrated in FIG. 16 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310a-310n may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include a front end module 340 (which may be configured to receive, authenticate, parse, throttle and/or dispatch service requests, among other things), one or more administrative components, or auto admin instances, 350 (which may be configured to provide a variety of visibility and/or control functions, as described in more detail herein), and a plurality of storage node instances (shown as 360a-360n), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360a-360n, and each may store tables on behalf of clients. Some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components or modules of the system that use external workflow component 370 may include these interfaces rather than interfacing directly to the interfaces provided by external workflow component 370. In some embodiments, the Web services platform 330 may rely on one or more external (and in some cases shared) resources, in addition to external workflow component 370. In some embodiments, external workflow component 370 may be used to perform distributed operations, such as those that extend beyond a particular partition replication group.

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and/or other partition management operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are pre-allocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
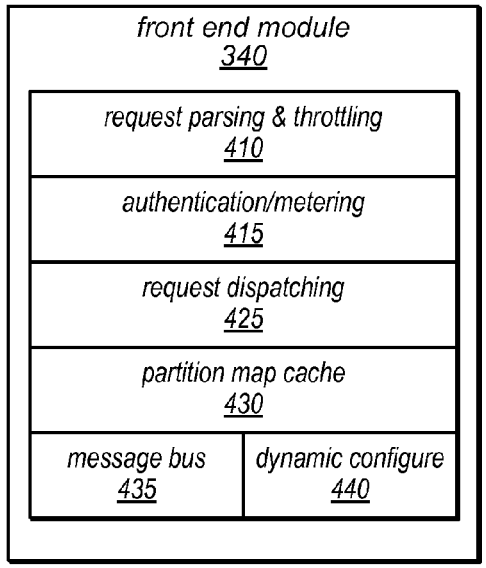
FIGS. 4A-4C are block diagrams illustrating various components of a Web services platform, according to one embodiment.
Figure 4B:
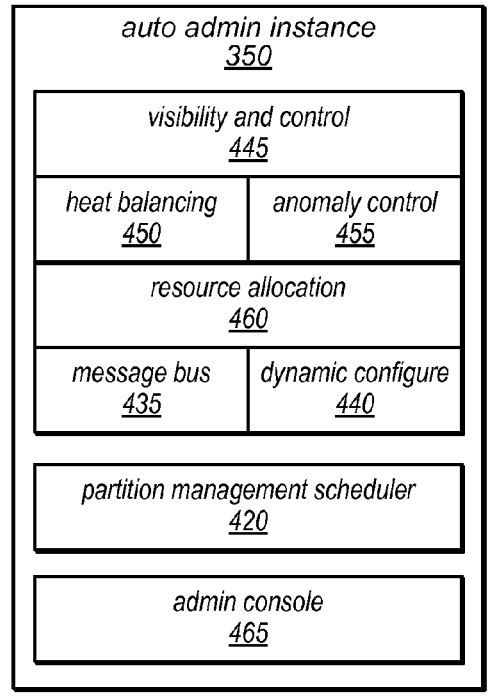
Figure 4C:
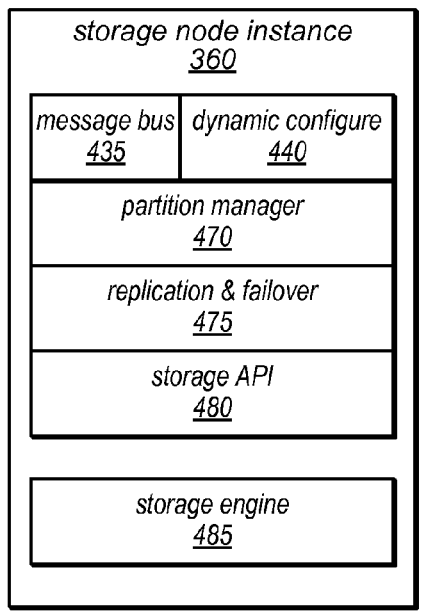

FIGS. 4A-4C illustrate various elements or modules that may be included in each of the types of components of Web services platform 330, according to one embodiment. As illustrated in FIG. 4A, front end module 340 may include one or more modules configured to perform parsing and/or throttling of service requests (shown as 410), authentication and/or metering of service requests (shown as 415), dispatching service requests (shown as 425), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of Web services platform 330 or in a component configured to interact with Web services platform 330 to provide the data storage services described herein.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). In some embodiments, resource allocation module 460, heat balancing module 450, and/or anomaly control module 455 may be configured to work separately or in combination to perform selection, ordering, or scheduling of candidate partition management operations (e.g., various partition splitting operations or partition moving operations), as described in more detail below. In other embodiments, a central partition management scheduler module 420 may be included in auto admin instance 350, as illustrated in FIG. 4B. Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific modules, auto admin instance 350 may also include components that are common to the different types of computing nodes that collectively implement Web services platform 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). In some embodiments, the partition manager 470 (or another component of storage node instance 360) may be configured to identify candidate partition management operations to be performed locally (e.g., on a given storage node instance 360) based, e.g., on one or more measures of the utilization of provisioned resources on the storage devices or logical storage volumes of the storage node instance. For example, the partition manager may be configured to apply one or more resource utilization policies or partition management policies to make local decisions about which, if any, partitions or partition replicas stored on the local storage devices or logical storage volumes should be split or moved. Once the partition manager 470 (or another component of storage node instance 360) identifies one or more candidate partition management operations, information about the candidate partition management operations may be sent to an auto admin instance 350 (e.g., to a central partition management scheduler 420 of an auto admin instance 350), which may schedule the candidate partition management operations for execution based on a global prioritization across the distributed database system. In other embodiments, resource utilization information may be sent from each storage node instance 360 to an auto admin instance 350 (e.g., to a central partition management scheduler 420 of an auto admin instance 350), which may identify candidate partition management operations, and may schedule the candidate partition management operations for execution based on a global prioritization across the distributed database system.

As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to re-configure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters, e.g., an UpdateTable API (which may be used to increase the provisioned throughput capacity for a given table), a PurchaseTableCapacity API (which may be used to increase the provisioned storage capacity for a given table), a SplitTable API (which may be used to explicitly invoke an operation to split a table or any of its partitions), or a MoveTable API (which may be used to explicitly invoke an operation to move one or more tables, partitions of a table, or partition replicas of a table).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API. Note that the amount of work required to satisfy service requests that specify these operations may vary depending on the particular operation specified and/or the amount of data that is accessed and/or transferred between the storage system and the client in order to satisfy the request.

In some embodiments, the system described herein may be configured to create and execute a database instance in a single-tenant environment on dedicated hardware (e.g., on a dedicated storage device) or on particular ones of the storage nodes in the system. In other embodiments, a database instance in a single-tenant environment may be created and may execute on a different virtual machine in a storage node than other database instances that are created and that execute on the same storage node. In some embodiments, the underlying software and/or hardware to implement the functionality for performing database operations that target tables in both types of environments (e.g., operations to store, retrieve, or delete data) may be the same (or substantially similar). However, since clients may be able to directly connect to database instances (and/or tables therein) in the single-tenant environment, there may not be a need for the system to provide an intermediate layer to provide security or other utilities required to support multi-tenancy. Instead, authentication checks may be skipped and clients may submit requests to perform operations on these tables directly to the underlying storage node(s), e.g., on a low-latency path.

In some embodiments, a client may submit a request to create a database instance (e.g., using a CreateDatabaseInstance API), and may submit a request for a description of a database instance (e.g., using a DescribeDatabaseInstance API), in response to which, the system may return a list of IP addresses at which the client may directly connect to the database instance (or a table therein) to perform various operations (e.g., create table, put item, get item, etc.). In general, a database instance in a multi-tenant environment may store tables for multiple different customers that all run within the same database instance. Therefore, the system may be required to keep clients from being able to access each other's tables using various security and authentication schemes. However, with a dedicated database instance in a single-tenant environment, the client may be given a specific IP address for the specific database instance, after which the client may configure a firewall group or another type of security group to limit the clients that are able to connect to that instance and/or create their own network connection to their table(s), e.g., a TCP connection that conforms to one of various open source protocols, in some embodiments.

Figure 5:
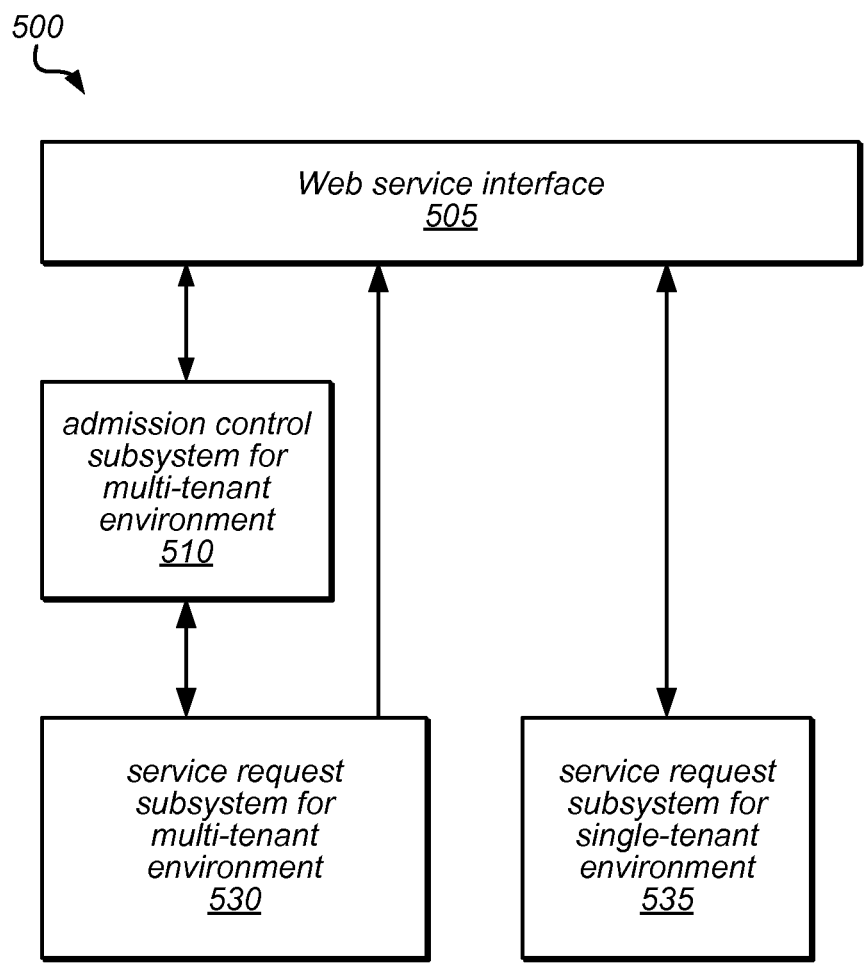
FIG. 5 is a block diagram illustrating subsystems of a system that provides various Web-based services to clients, according to one embodiment.

FIG. 5 is a block diagram illustrating a computing system 500 that provides various Web-based services to clients, according to some embodiments. For example, in some embodiments, computing system 500 may implement a Web server, such as Web services platform 330 illustrated in FIG. 3. In various embodiments, computer system 500 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 500 in order to provide services requested by various clients. For example, in order to satisfy a service request directed to a data storage system, the data storage system may allocate one or more database connections, input/output channels, storage resource portions and/or other resources for each normalized, logical work unit or logical service request unit required to satisfy the request. As illustrated in this example, computing system 500 may include a Web service interface 505, an admission control subsystem 510 for use in a multi-tenant environment, a service request subsystem 530 for managing requests directed to tables in a multi-tenant environment, and a service request subsystem 535 for managing requests directed to tables in a single-tenant environment.

In this example, Web services interface 505 may be configured to receive requests for services from various clients and to communicate with admission control subsystem 510 to facilitate the performance of those services on behalf of the clients. For example, in some embodiments, admission control subsystem 510 may be configured to determine which and/or how many service requests that are directed to tables in a multi-tenant environment to accept from various clients, and may communicate with a service request subsystem 530 to accept and/or service one or more received service requests. In some embodiments, admission control subsystem 510 may be configured to determine which and/or how many service requests to accept dependent on a maximum request rate for the system and/or for a particular client, application, target, request type, or operation. As described herein, the maximum request rate may be dynamically adjusted dependent on the current work throughput rate and/or a target or committed work throughput rate. In other embodiments, service requests may be managed using work-based tokens. In various embodiments, admission control subsystem 510 may implement one or more admission control mechanisms, including any admission control mechanism suitable for managing service requests that have non-uniform workloads.

In some embodiments, if a service request is accepted for servicing by admission control subsystem 510, service request subsystem 530 may in turn be configured to allocate (or initiate allocation of) one or more resources needed to perform the requested services to those requests, and/or to return results to the client via Web services interface 505. For example, in embodiments in which the system provides data storage services, in response to a query request that is accepted by admission control subsystem 510, service request subsystem 530 may access the table to which the query is directed and may return the query results to the client via Web services interface 505. In some embodiments, admission control subsystem 510 may be configured to throttle and otherwise manage service requests that have non-uniform workloads (e.g., adjusting a maximum request rate dependent on a current work throughput rate. In other embodiments, this functionality may be provided by another component of the system, which may provide the maximum request rate to the admission control subsystem for use in throttling service requests. In some embodiments, admission control subsystem 510 may implement a "leaky bucket" based admission controller. In some embodiments, Web service interface 505 may utilize predefined instructions or communications, such as via defined application protocol interfaces (APIs), to communicate with admission control subsystem 510 and/or other components of computing system 500 on behalf of a client.

In this example, service request subsystem 535 may be configured to allocate (or initiate allocation of) one or more resources needed to perform requested services that are directed to tables in a single-tenant environment, and/or to return results to the client via Web services interface 505, without performing all of the operations described above as being performed by admission control subsystem 510. For example, in embodiments in which the system provides database or data storage services for tables in a single-tenant environment, in response to a query request, service request subsystem 535 may access the table to which the query is directed and may return the query results to the client via Web services interface 505.

Note that in various embodiments, the components illustrated in FIGS. 4A-4C and/or 5 may be implemented directly within computer hardware, as instructions directly or indirectly executable by computer hardware (e.g., a microprocessor or computer system), or as a combination of these techniques. For example, the components of the computing system 500 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C and/or 5.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in an admission control module or a similar component of another type of system that provides services to clients, and that is configured to receive, accept, and/or service requests on behalf of those clients.

Figure 6:
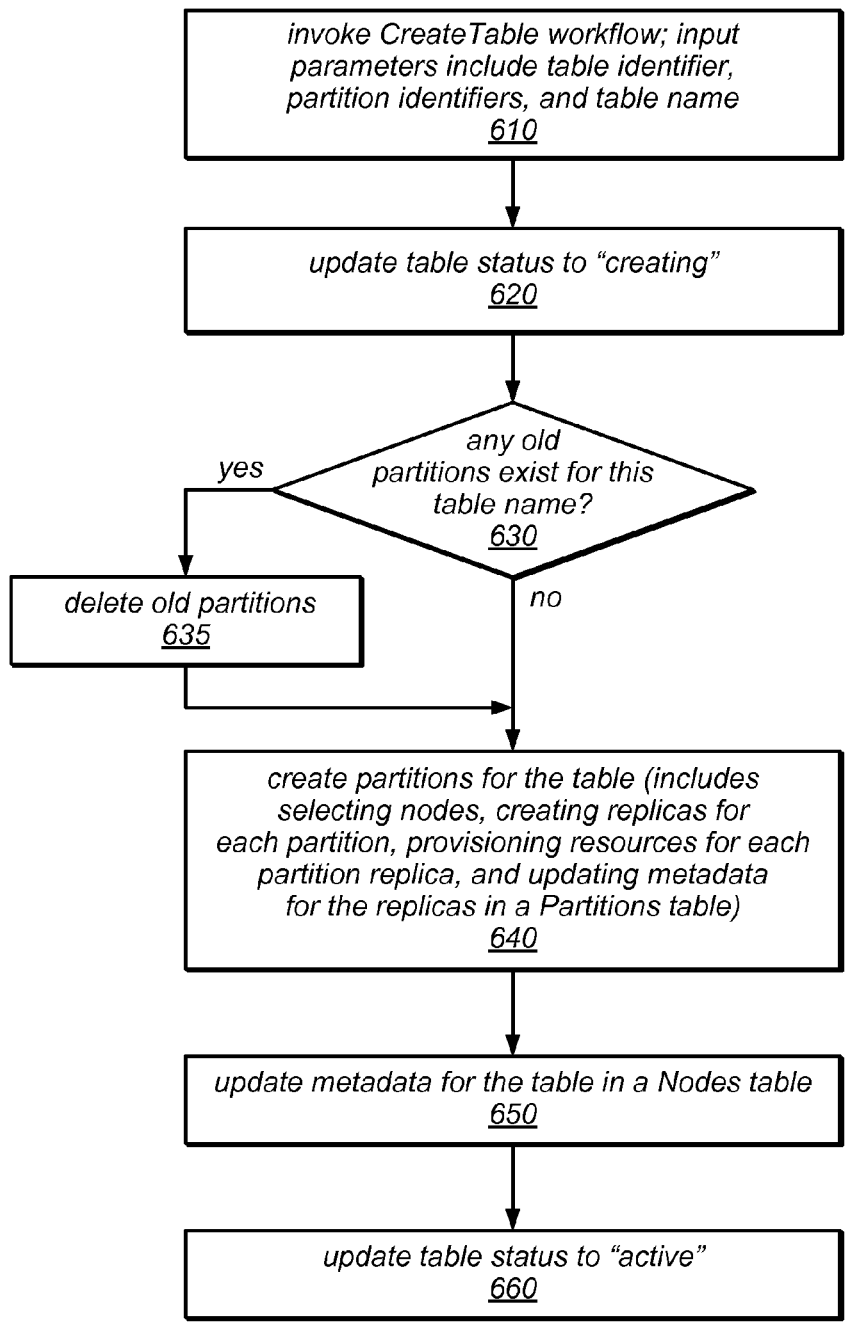
FIG. 6 is a flow diagram illustrating one embodiment of a workflow for creating a table.

As previously noted, a system that is configured to implement the data storage service described herein may rely on one or more workflows that are executed using an external workflow service. FIG. 6 illustrates one embodiment of such a workflow for creating a table. As illustrated at 610, the method may include invoking the CreateTable Workflow (e.g., in response to a request to create a table, and subsequent to generating metadata for the new table). As illustrated in this example, in some embodiments, the table name, table identifier, and/or partition identifiers may all be passed to the CreateTable workflow as inputs to that process. Note that this (and/or any other service requests described herein) may include an input parameter identifying a particular subscriber, such as an accountID parameter. In such embodiments, the value of this input parameter may be passed to any workflows invoked in response to receiving the service request (e.g., the CreateTable workflow).

In some embodiments, a CreateTable workflow may allocate one or more partitions for a new table, create two or more replicas each for the partitions, and update the appropriate metadata in response to creating the table. One embodiment of such a workflow is illustrated by the flow diagram in FIG. 6. The workflow may be intended to be self-healing, in some embodiments. In such embodiments, if the process fails before completion, the whole workflow may be rerun one or more times until it succeeds. For example, each of the operations illustrated in FIG. 6 may be retried again and again in response to a failure. Note that in this example, it is assumed that the workflow is invoked only after determining that no active table exists that has the specified table name.

As illustrated in this example, the workflow may include updating the status of the table to "Creating" to reflect the fact that a workflow is currently working to create the table, as in 620. In some embodiments, the table status may be atomically updated to "Creating". In such embodiments, if multiple workflows attempt to perform this same table creation operation, only one will succeed, thus allowing the system to avoid a race condition, in this case. The workflow may also include determining whether any old partitions exist that include the table name specified for the new table, as in 630. For example, if a creation operation specifying this table name has been attempted (and failed) in the past, there may be remnant partitions remaining in the system that should be deleted before proceeding with the rest of the CreateTable workflow. In some embodiments, the workflow may include querying metadata (e.g., the Tables table) for any partitions associated with this table name. For example, there may be remnants of a previous failed attempt to create a table with this table name in the system, including metadata for the table in one or more metadata tables. For each partition found, there may be multiple replicas, and each of these replicas may be physically deleted from the storage nodes on which they reside, as in 635.

If no partitions associated with the specified table name are found (e.g., if this table creation operation has not been previously attempted and failed), shown as the negative exit from 630, or once such remnants have been deleted, the workflow may create one or more partitions for the new table, as in 640. As previously described, in some embodiments, the number of partitions created may be based on user input, historical data, and/or system-wide, client-specific, or application-specific defaults. As illustrated in FIG. 6, creating partitions for the new table may include selecting nodes on which to store multiple replicas of each of the partitions, creating the multiple replicas (which may include provisioning storage resource capacity and/or throughput capacity for each replica of each of the partitions), and updating the partition metadata (e.g., updating a "Partitions table" to include the newly created replicas and to indicate their locations). In some embodiments, selecting the nodes on which to store the replicas may include querying metadata to discover healthy nodes on which replicas can be stored, and allocating replicas to various ones of the healthy nodes using any of a variety of suitable allocation algorithms. In some embodiments, the system may support two or more flexible and/or pluggable allocation algorithms, including, but not limited to, selecting the nodes that have the most available storage space, selecting the nodes experiencing the lightest workload (e.g., the nodes receiving the fewest service requests), or selecting nodes at random (which may minimize a herding effect in which all new partitions go to the most lightly loaded nodes).

As illustrated in FIG. 6, the CreateTable workflow may include updating node related metadata for the newly created table (e.g., in a "Nodes table"), as in 650. For example, the workflow may include reading all of the node locations of the newly created replicas from the Partitions table (which was updated in 640), and adding each of the newly created replicas to the appropriate entries of the Nodes table. Once the table's partitions (and their replicas) have been created, and the appropriate metadata has been updated to reflect the creation of the new table, the workflow may include updating the status of the newly created table to "Active", as in 660. In some embodiments, updating the status of the newly created table to "Active" may include decrementing a count of the number of tables that are in the Creating state in the Subscribers table described above.

Figure 7:
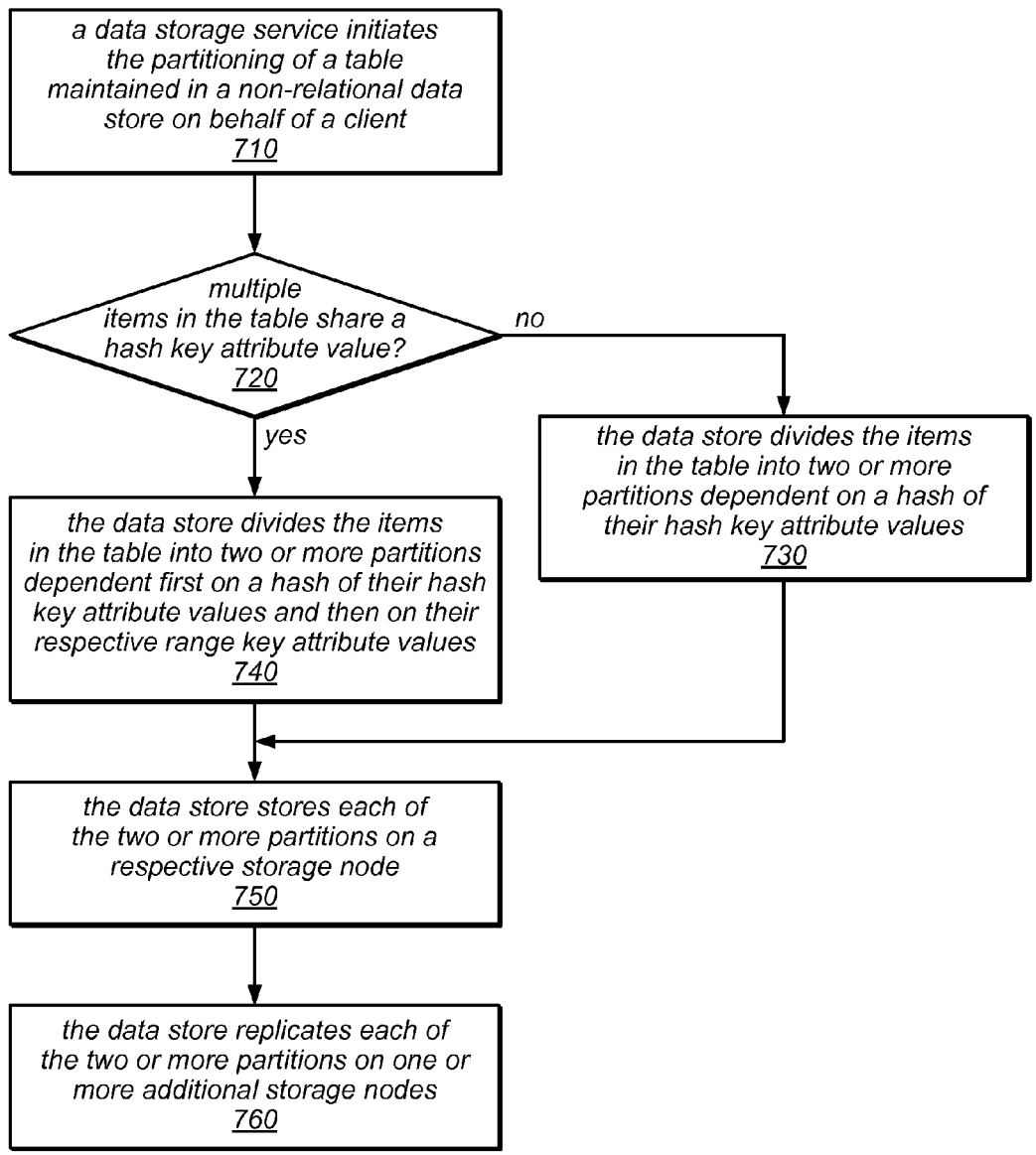
FIG. 7 is a flow diagram illustrating one embodiment of a method for partitioning a table maintained in a non-relational data store.

As previously noted, in embodiments in which the primary key is a simple key, the item in a table being maintained on behalf of a storage service client may partitioned using a hash of the primary key value of each of the items, while in embodiments in which the primary key is a composite key, the data may be partitioned first by a hash of the hash key component, and then by the range key component. FIG. 7 illustrates one embodiment of a method for partitioning table data using simple and/or composite keys, according to one embodiment. As illustrated at 710, in this example, the method may include a data storage service (or a component of the underlying system that implements a data store, such as a storage node instance or administrative component) initiating the partitioning of a table maintained in a non-relational data store on behalf of a storage service client.

If multiple items in the table share a hash key attribute value, shown as the positive exit from 720, the method may include the data store dividing the items in the table that have a given hash key attribute value into two or more partitions (e.g., database partitions) dependent first on a hash of their range key attribute values, and then on their range key attribute values, as in 740. In other words, if the primary key for the table is a composite key that includes hash key component whose values may be used to identify a group of items and a range key component whose values may be used to order items having the same hash key attribute values and uniquely identify each of those items, both the hash key attribute value and the range key attribute value may be used to partition the items in the table. For example, for a group of items that have the same hash key attribute value, the first n items in the group (when ordered by their respective range key attribute values) may be assigned to one partition, the next m items in the group may be assigned to a second partition, and so on. Note that in some embodiments, each partition may include a portion of the items sharing one hash key attribute value and may also include other items having other hash key attribute values.

If none of the items in the table share a hash key attribute value, shown as the negative exit from 720, the method may include the data store dividing the items in the table into two or more partitions dependent on a hash of their respective hash key attribute values, as in 730. For example, if the primary key for the table is a simple key that includes hash key component whose values may be used to uniquely identify each of the items in the table, the items in the table may be partitioned (i.e. assigned to one of a plurality of partitions) dependent a hash of the hash key attribute value, but not dependent on any other item attribute values. In some embodiments, if the primary key is a composite key, but none of the items in the table share a hash key attribute value (i.e. if each item has a unique hash key attribute value), the data store may partition the items as if the primary key were a simple key (i.e. it may partition the items in the table using the hash key attribute value alone).

Once the data store has assigned all of the items to a partition, the data store may store each of the partitions on a respective storage node (e.g., a respective computing node or storage device), as in 750, which may include provisioning storage resource capacity and/or throughput capacity for each of the partitions on their respective storage nodes. In some embodiments, each partition of a single table may be stored on a different storage node, while in other embodiments two or more of the partitions may be maintained on the same storage node. In various embodiments, each of the resulting partitions may be replicated one or more times in the data storage system, as in 760, which may include provisioning storage resource capacity and/or throughput capacity for each of the replicas on respective storage nodes. Note that in some embodiments, the number of partitions into which the items of a given table are partitioned may be pre-determined (e.g., it may be based on user input/preferences, or historical data for a client, account, or table type), while in other embodiments, the number of partitions into which the items of a given table are partitioned may be determined as the partitioning operation progresses, e.g., based on the number of items in each range of hash results and/or the number of items in each range of range key attribute values. Note also that because the partitioning is based on a hash result, the order in which groups of items may be assigned and distributed among the available partitions may be somewhat randomized. In some cases, e.g., if some items are accessed much more frequently than others or some groups of items include a higher number of items than others, an initial partitioning may result in hot spots. In such cases, a partition management operation (e.g., a partitioning splitting operation or a partition moving operation) may be performed in order to more evenly distribute the items among the available partitions (e.g., with respect to data volume and/or service request traffic). Note also that in some embodiments, the items in a table may be partitioned using a single hash key component and two or more range key components.

In one example of the partitioning of items in a given table, the hash key attribute is a "User name" attribute, and the range key attribute is a "Message ID" attribute. In this example, the given table stores multiple messages associated with each of three user names (Bob, Sue, and Phil). In this example, some partitions of the given table may include only items having the same hash key attribute value. In this example, a partition identified by a Partition ID value of A may store only messages having the hash key attribute value "Bob". Note that this partition may not store all of Bob's messages, but only messages having Message ID values (i.e. range key attribute values) 1-199. Another group of Bob's messages (those with range key attribute values 200-299) may be stored in a partition identified by a Partition ID value of B. This partition may also store messages having a hash key attribute value of "Sue", specifically, those messages having range key values of 1-50. Yet another group of Bob's messages (those with range key attribute values 300-399) may be stored in a partition identified by a Partition ID value of C. This partition may also store messages having a hash key attribute value of "Phil", specifically, those messages having range key values of 1-100.

In this example, a request to retrieve all of Bob's messages may retrieve messages 1-199 from partition A (which may be maintained on a particular storage node), messages 200-299 from partition B (which may be maintained on a different storage node), and messages 300-399 from partition C (which may be maintained on yet another storage node). In some embodiments, a request to retrieve all of these messages may be terminated early (e.g., if response limit is reached), and the remaining messages may be retrieved in response to a subsequent request.

As previously noted, in some embodiments, the data storage service (and/or underlying system) described herein may provide two different APIs for searching the data maintain in tables on behalf of storage service clients: a Scan API and a Query API. In some embodiments, the Scan API may be used to request an operation that scans an entire table. A Scan request may specify one or more filters to be applied to the results of the scan operation, e.g., to refine the values returned to the requestor following the complete scan. In some embodiments, the Query API may support comparison operations to limit the search process to the data that matches the supplied query conditions (e.g., conditions on the attributes of the items). For example, a Query request may be used to find all the data in a table that matches the parameters specified in the request, up to a pre-defined limit (if such a limit is imposed by the system).

Figure 8:
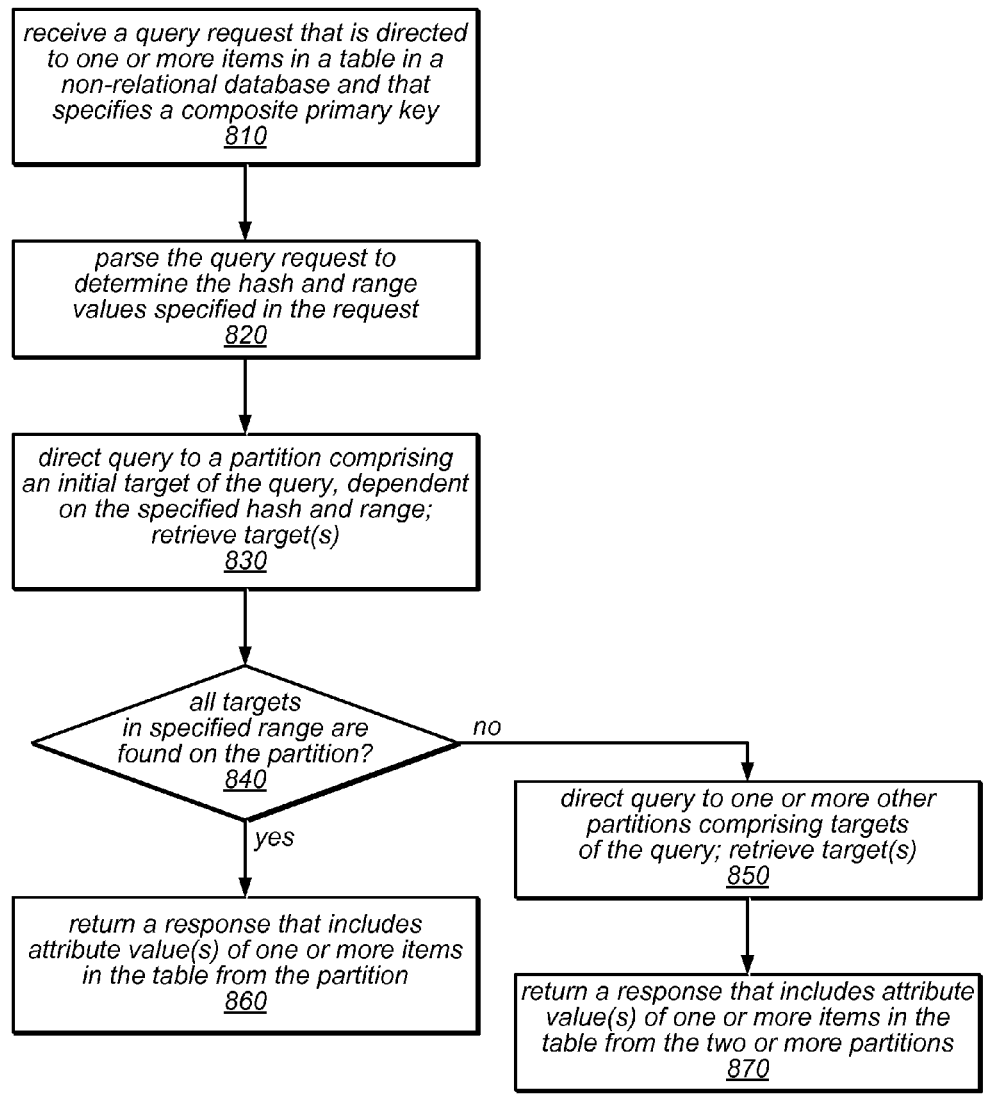
FIG. 8 is a flow diagram illustrating another embodiment of a method for performing a query.

A more detailed example of a method for performing a query, as specified by the API described herein, is illustrated by the flow diagram in FIG. 8, according to one embodiment. As illustrated at 810, in this example, the method may include receiving a service request to perform a query that is directed to one or more items in a table in a non-relational database (e.g., a table maintained on behalf of a data storage service client). As in previous examples, the request may include a table name (which may identify the table that is the target of the query), and a primary key value. In this example, the specified primary key value is a composite key value (i.e. the primary key for the identified table is a composite primary key dependent on a hash key value and a range key value), and the query may target multiple items that match the hash key value and range key condition specified in the request, as described herein. As illustrated at 820, the method may include parsing the request to determine the hash and range values specified in the request.

The method may include directing the query to a partition that comprises an initial target of the query, dependent on the specified hash and range values, and retrieving information about one or more targets of the query (e.g., attribute values of the items targeted by the query) from that partition, as in 830. For example, in some embodiments, the items matching a particular hash key value may be ordered in the table by their range key values. In such embodiments, the combination of the specified hash key value and the first range key value that matches the specified range key condition may uniquely identify the first item in the table that matches the query conditions. In such embodiments, a query may first be directed to the partition that contains the item identified by this combination. In some cases, one or more additional items matching the specified hash key value and the specified range key condition may be present on the first partition to which the query is directed, and all of these targets (i.e. the items themselves and/or a specified subset of their attribute values) may be returned in response to the query.

In some cases, some of the items matching both the specified hash key value and the specified range key condition may be stored on one or more partitions of the table other than the first partition to which the query was directed. If so, shown as the negative exit from 840, the query may be directed to the one or more other partitions, and these additional query targets may be retrieved, as in 850. For example, the number of items matching both the specified hash key value and the specified range key condition may be larger than the number of items stored in each partition of the table. In another example, because of the order in which items are sorted and stored in the table and/or assigned to various partitions (e.g., in embodiments in which items are sorted in a particular order and assigned to a particular partition according to their range key values), the targeted items may cross a partition boundary. In these and other cases, the method may include returning a response that includes one or more attribute values of one or more items matching both the hash key value and the range key condition, as in 870, where some of the one or more items matching both the hash key value and the range key condition may be retrieved from different partitions (and, in some cases, different physical computing nodes or storage devices).

As illustrated in FIG. 8, however, if all of the items matching both the specified hash key value and the specified range key condition are stored on the first partition to which the query was directed, shown as the positive exit from 840, the method may include returning a response that includes one or more attribute values of one or more items matching both the hash key value and the range key condition, as in 860, where all of the one or more items matching both the hash key value and the range key condition are retrieved from the initially targeted partition (and, thus, a single physical computing node or storage device).

In various embodiments, a Scan API may be used to retrieve one or more items and attributes stored in a table on behalf of a storage service client by performing a full scan across the table. The items returned may be limited by specifying a filter. In some embodiments, the Scan API may support richer semantics than the Query API described above. For example, it may support comparison operators such as "CONTAINS", "IS NULL", "IN", etc.

In some embodiments, any or all of the metadata described herein as being used in maintaining and managing tables on behalf of a data storage service client (including any metadata tables described herein) may be stored in the same scalable data store (e.g., the same non-relational database) as that in which the client/user tables are stored. For example, various computing nodes may store user data (e.g., in tables maintained on behalf of a user) and/or system data, including metadata used by the data storage service, such as that described above. Therefore, each node of the data model for such a system may include an indicator of the type of the node. For example, in one embodiment, each node may be designated as a "storage node", a "request router", an "auto-admin" node, or a "staging" node. In some embodiments, a "storage node" may store user data in one or more tables maintained by the data storage service, but metadata (e.g., data stored in one or more of a Tables Table, a Subscribers Table, a Partitions Table, or a Nodes Table) may be hosted on other types of nodes (e.g., "auto admin" nodes and/or "staging" nodes). In other embodiments, such metadata may be stored on one or more "storage nodes", some of which may also store user data. Each each node may also include an identifier of the node, and one or more other elements. In some embodiments, information about each replica may be represented in the data model, and each replica in the data model may include an identifier of the node on which the replica is hosted, and one or more partition identifiers indicating the partitions included in those replicas. For example, each partition may be represented in the data model as a partition element, which may include its partition-id. In various embodiments, each node may host multiple replicas, and each partition may be included in multiple replicas.

In various embodiments, there may be situations in which a partition (or a replica thereof) may need to be copied, e.g., from one machine to another. For example, if there are three replicas of a particular partition, each hosted on a different physical or logical machine, and one of the machines fails, the replica hosted on that machine may need to be replaced by a new copy (replica) of the partition on another machine. In another example, if a particular machine that hosts various replicas of multiple partitions of one or more tables experiences heavy traffic, one of the heavily accessed partition replicas may be moved (e.g., using a copy operation followed by an operation to redirect traffic) to a machine that is experiencing less traffic in an attempt to more evenly distribute the system workload and improve performance. In some embodiments, the data storage service (and/or underlying system) described herein may perform replica moves and/or replica copying using a physical copying mechanism (e.g., a physical file system mechanism) that copies an entire partition replica from one machine to another, rather than copying a snapshot of the partition data row by row (as in a traditional logical database partition copying operation). As described in more detail herein, in some embodiments, all write operations may be logged before being applied to a particular partition (and/or various replicas thereof), and they may be applied to the partition (i.e. to the replicas thereof) periodically (e.g., in batches). In such embodiments, while a partition replica is being copied, write operations targeting the partition may be logged. During the copy operation, these logged write operations may be applied to the partition at periodic intervals (e.g., at a series of checkpoints). Once the entire partition has been copied to the destination machine, any remaining logged write operations (e.g., any write operations performed since the last checkpoint, or any write operations that target portions of the partition that were copied to the destination prior to those write operations being logged) may be performed on the destination partition replica by a final catch-up process. In some embodiments, the catch-up process may examine the sequentially ordered write operations in the log to determine which write operations have already been applied to the destination partition replica and which, if any, should be applied to the destination partition replica once the physical copying of the partition data is complete. In such embodiments, unlike with traditional partition copying or moving mechanisms, the data in the destination partition replica may be consistent following the completion of the operation to move/copy the partition replica.

Figure 9:
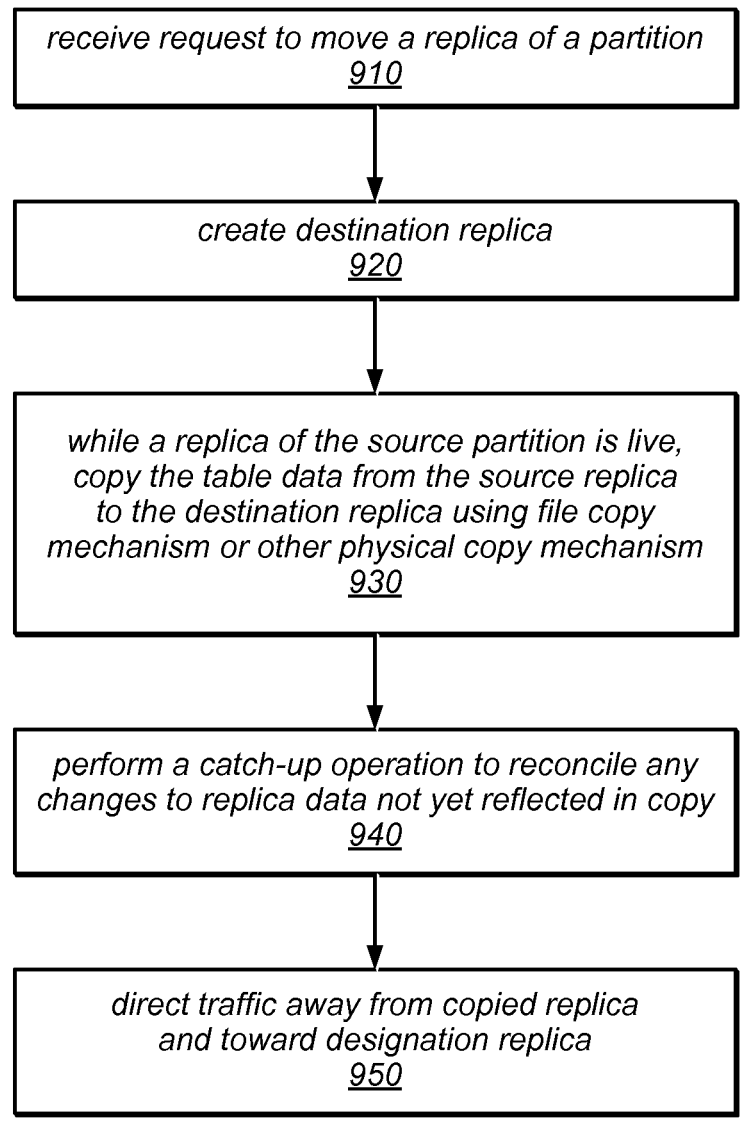
FIG. 9 is a flow diagram illustrating one embodiment of a method for moving a replica of a partition of a table being maintained by a data storage service on behalf of a storage service client while the partition is "live".

One embodiment of a method for moving (or copying) a replica of a partition of a table being maintained by a data storage service on behalf of a storage service client while the partition is "live" is illustrated by the flow diagram in FIG. 9. In this example, the method may include a component of the system that implements the data storage service receiving a request to move a replica of a partition, as in 910. For example, the system may receive an explicit request to move a replica from a client/user or system administrator, or such a request may be automatically generated in the system in response to detecting an anomaly (as described in more detail herein). As illustrated at 920, in response to receiving the request to move the partition, the system may be configured to create a new replica (which may be referred to as a destination replica), while the partition is live (i.e. while one or more replicas of the partition continue to accept and service requests directed to the partition). In some embodiments, creating a destination replica may include selecting a computing node or storage device on which to create the destination replica, allocating memory on the computing node or storage device for the destination replica, creating or updating metadata associated with the partition and/or the destination replica, and/or performing other functions appropriate for creating the destination replica.

As illustrated in this example, the method may include the system copying table data from the replica being moved (or from another source replica storing the same table data as the replica being moved) to the destination replica using a file copy mechanism or another physical copy mechanism while one or more replicas of the partition are live, as in 930. In other words, the replica may be copied to the new destination replica using an operation that copies the physical locations of the replica data, rather than using a logical copying operation (e.g., one that reads and copies table data on a row-by-row basis). As illustrated at 940, after performing the physical copying operation, the method may include the system performing a catch-up operation to reconcile any changes to the replica data that were made during the copy operation but that are not yet reflected in the new copy. This catch-up operation is described in more detail below. Once the destination replica has been created and populated, the method may include directing traffic away from copied replica and toward the new designation replica, as in 950. For example, the system may configure the new destination replica to receive and service requests targeting table data that was maintained on the particular partition replica and some or all service requests targeting the partition may be directed away from the source replica and toward the new destination replica.

Note that in some embodiments, information about a requested move operation may be added to database table, list, or other data structure that stores information about candidate partition management operations prior to the requested move operation being scheduled for execution. In such embodiments, a central partition management scheduler may be configured to schedule the requested move operation for execution according to a global prioritization scheme and in light of other pending partition management operations for which information is stored in the database table, list, or other data structure (e.g., other partition management operations requested by a client/user or system administrator, partition management operations initiated by the system in response to detecting an anomaly in the system, and/or candidate partition management operations that were identified by various storage nodes), as described herein.

Figure 10:
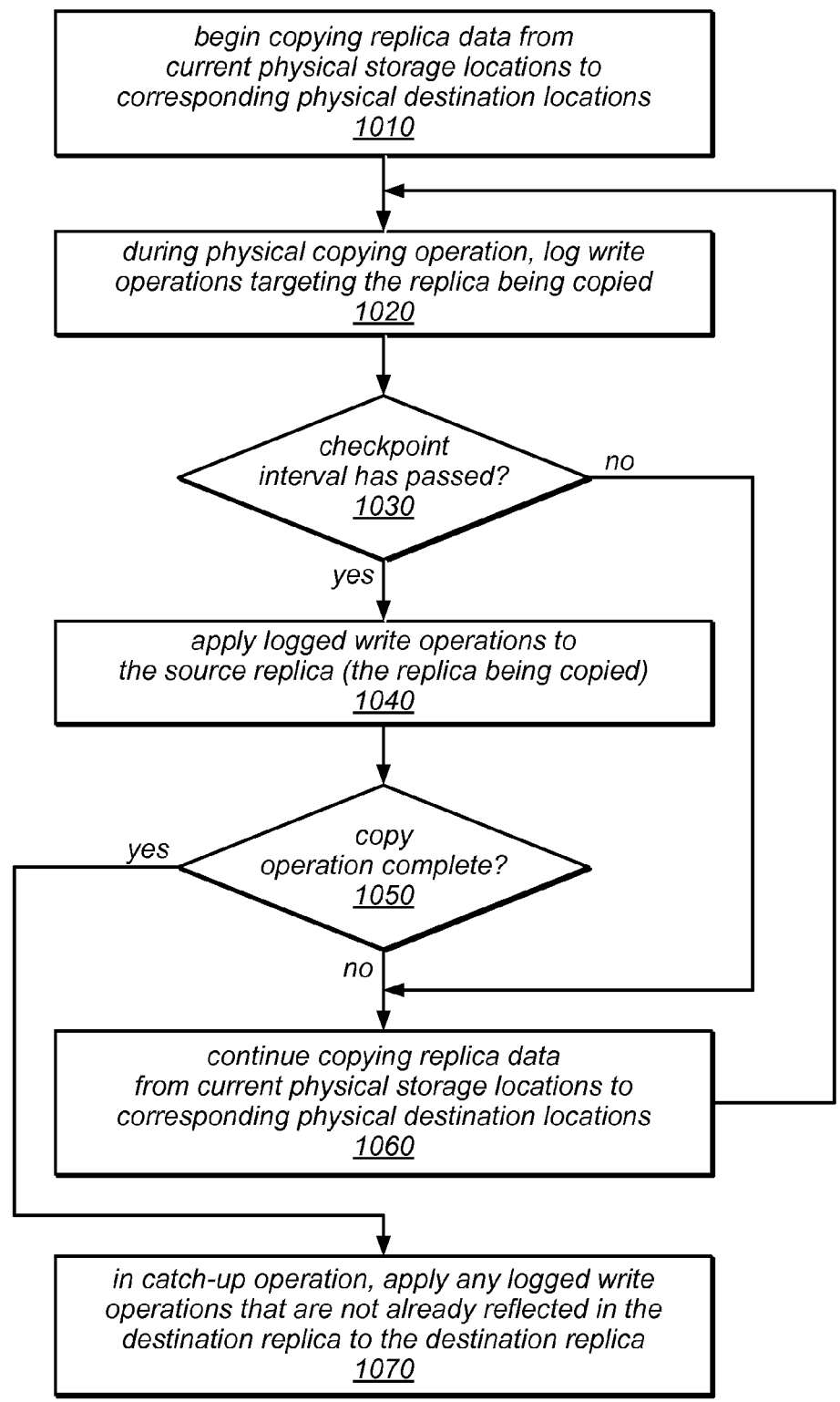
FIG. 10 is a flow diagram illustrating one embodiment of a method for copying a replica using a physical copy mechanism.

In some embodiments, the storage engine for the underlying data store of a data storage service (e.g. a non-relational database) may store replica data in database files, and each replica (and database file) may be associated with a recovery log. In such embodiments, when a service request to modify the replica data is received, it may be logged in the recovery log before being applied to the replica. In the case of a node failure or system crash, the changes logged in the recovery log may be reapplied to a previous snapshot or checkpoint of the replica data to recover the contents of the replica. As noted above, in some embodiments, the data storage service (and its underlying system) may support a replica move operation and/or a replica copying operation that employs a physical copy mechanism. In some such embodiments, the physical copy mechanism may employ such a log, which may ensure that the replica data that is moved to a new destination is consistent. FIG. 10 illustrates one embodiment of a method for copying a replica using a physical copy mechanism, as described above. In this example, the method begins copying replica data from its current physical storage locations to corresponding physical destination locations, as in 1010. In some embodiments, the physical copy operation may include copying pages from one physical storage device (e.g., disk storage) to a destination storage device over a network.

As illustrated at 1020, during the physical copying operation, write operations targeting the partition whose replica is being copied may be logged before being applied to the replica being copied, as described above. In various embodiments, each logged write operation (or group of write operations) may be assigned a log sequence number. In some embodiments, the logged changes may be applied to the replica being copied (and/or to other replicas that store the same table data) at periodic checkpoint intervals. In the example illustrated in FIG. 10, when a pre-determined checkpoint interval passes, shown as the positive exit from 1030, all of the modifications (e.g., write operations) logged since the last checkpoint may be applied to the replica being copied (e.g., the source replica) and/or to other replicas that store the same table data. Because these updates are applied while the source replica is being copied, some of these modifications will be reflected in the destination replica as a result of the copying operation (e.g., modifications that were applied to a given portion of the replica data before that portion of the data was copied to the destination). Other modifications may not be reflected in the destination replica following the copying operation (e.g., modifications that were applied to a given portion of the replica data after that portion of the data was copied to the destination).

As illustrated in FIG. 10, the method may include continuing to copy replica data from current physical storage locations to corresponding physical destination locations while it is not complete (shown as the negative exit from 1050, element 1060, and the feedback to 1020). The method may include continuing to log write operations (as in 1020) and to apply logged write operations to the source replica, i.e., the replica being copied, (as in 1040) each time the checkpoint interval passes (shown as the positive exit from 1030). Once the physical copy operation is complete (shown as the positive exit from 1050), the method may include performing a catch-up operation, in which any logged write operations that are not already reflected in the destination replica are applied to the destination replica, as in 1070. Thereafter, if the copying of the partition was performed as part of an operation to move the partition replica, some or all accesses targeting the partition whose replica was copied may be directed away from the source replica and directed toward the new destination replica. For example, any write operations targeting the partition may be logged in a recovery log for the destination replica, and subsequently applied to the destination replica (e.g., at the next periodic checkpoint). In some embodiments, following the copying of the replica to a new destination (e.g., as part of a move operation), the log in which modifications to the source replica were logged may be copied (or used directly) for the recovery log for the destination replica.

In some embodiments, the replica copying process described above may be employed in partition splitting operations. For example, a partition may be split because it is large (e.g., because it is becoming too big to fit on one machine) and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

Note that in some embodiments, moving (or copying) a replica of a partition in a cluster may be quicker than splitting a partition, because the system may take advantage of the file copying process described above for replica copying. Splitting a partition, on the other hand, may require logically dividing the partition data in one underlying data structure (e.g., one B-tree) into two such data structures (e.g., two B-trees), which is generally less efficient than moving an entire replica, as described above. Therefore, in some embodiments, a partition splitting process may include creating additional replicas of the partition, and thereafter managing only a portion of the partition data on each replica. For example, if there are three replicas of a given partition that is to be split, the partition splitting process may include creating three additional copies of the entire partition (e.g., using the partition copying process described above). These resulting six replicas may be split into two new replica groups of three replicas, each of which may be configured to be responsible for handling service requests directed to half of the original partition data by invoking an operation to split the responsibilities between the replica groups. For example, following the operation to split the responsibilities, service requests directed to data in a designated portion of the original partition may be accepted and serviced by replicas of a given replica group, while service requests targeting the remaining data of the original partition may be rejected by that replica. In some embodiments, the partition data for which a given replica is not responsible may eventually be removed (e.g., so that the memory allocated to the replica for data it no longer supports may be subsequently used to store new items in the replica), or the memory in which it was stored may be reclaimed by the system (e.g., so that the memory allocated to the replica for data it no longer supports may be subsequently used by another partition). Removal of unsupported data or reclamation of memory may be performed by background tasks without affecting the performance of the data storage system, and may be transparent to clients/users.

In some embodiments, each partition may be identified by a partition ID, which may be a unique number (e.g., a GUID) assigned at the time the partition is created. A partition may also have a version number that is incremented each time the partition goes through a reconfiguration (e.g., in response to adding or removing replicas, but not necessarily in response to a master failover). When a partition is split, two or more new partitions may be created, each of which may have a respective new partition ID, and the original partition ID may no longer be used. In some embodiments, a partition may be split by the system using a split tool or process in response to changing conditions. For example, a scheduled task of an auto admin instance may monitor partition sizes and "heat" (e.g., traffic directed to each partition), and may apply policies that determine when to use the splitting tool/process to perform a split. In some embodiments, the splitting tool and auto admin instance may avoid attempting two splits at the same time by employing a lock manager.

In some embodiments, the monitoring component may provide a list of partitions that meet the split criteria to the splitting tool/process. In other embodiments, one or more lists of candidate split operations (and/or move operations) may be provided by various ones of the storage nodes in response to a query or when the storage nodes detect a trigger condition for a partition splitting operation or a partition moving operation. The criteria may be based on partition size and heat, where heat may be tracked by internally measured metrics (such as IOPS), externally measured metrics (such as latency), and/or other factors. In some embodiments, the splitting tool/process may receive a request to split a partition from the monitoring component that includes a partition ID and a version number for the partition to split, and a list of machines (e.g., machines in the same cluster or storage silo that are known to be lightly loaded) for the location(s) of the new partitions/replicas. Including the version number as an input to the splitting tool/process may ensure that the splitting tool/process does not attempt to split a partition that has already gone through one or more reconfigurations since the last time it was evaluated against the split criteria, as the splitting tool/process may reject the request if version number does not match.

Figure 11:
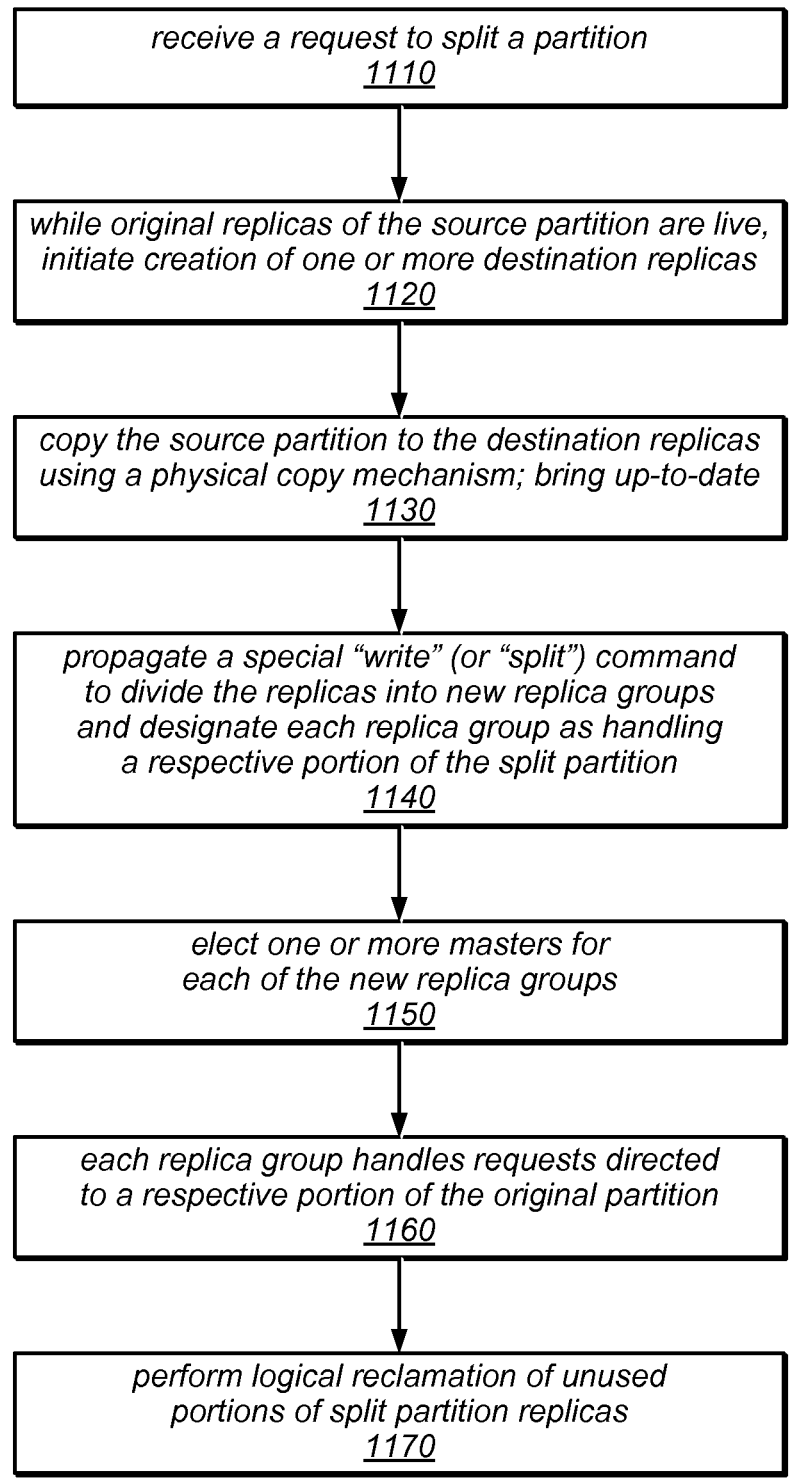
FIG. 11 is a flow diagram illustrating one embodiment of a method for splitting a partition of a table being maintained by a data storage service in response to a request to do so.

One embodiment of a method for splitting a partition of a table being maintained by a data storage service on behalf of a storage service client is illustrated by the flow diagram in FIG. 11. In this example, the method may include a component of the system that implements the data storage service receiving a request to split a partition, as in 1110. For example, the system may receive an explicit request to split the partition from a client/user or system administrator, or such a request may be automatically generated in the system in response to detecting an anomaly (as described in more detail herein). As described above, in some embodiments, splitting a partition may involve creating additional replicas of the partition, dividing the resulting collection of partition replicas into two or more new replica groups, and then designating each of the replica groups as managers of a respective portion of the original partition. Therefore, as illustrated at 1120, in response to receiving the request to split the partition, the system may be configured to initiate creation of the one or more new partition replicas (which may be referred to as destination replicas), while one or more of the original replicas of the source partition are live (i.e. while one or more of these replicas continue to accept and service requests directed to the partition). As illustrated at 1130, the method may include copying data from one or more source partition replicas to the destination replicas using a physical copy mechanism (such as that described above). For example, the system may be configured to copy the table partition data from one (or more) of the original replicas of the partition to one or more of the destination replicas using a file copy mechanism, in some embodiments. The method may also include bringing the new replicas (once populated) up-to-date (e.g., by performing a catch-up operation, as described above).

As illustrated in this example, the method may include propagating a special "write" command (i.e. a "split" command) to split the partition by dividing the resulting collection of replicas into two or more new replica groups and designating (and/or configuring) each replica group as handling service requests directed to a respective portion of the split partition, as in 1140. In some embodiments, the system may take the source replicas out of use briefly while the command to split the partition replicas is propagated to the storage nodes on which the resulting collection of replicas are hosted. In other words, the system may not accept other service requests directed to the partition being split while the split command is operating to configure the new replica groups to receive subsequent service requests. In an example in which a partition is being split into two new partitions, the split command may instruct the replicas resulting from the copy operation to split in half by designating each replica as belonging to the first half of the range or the second half of the range, thus forming two new replica groups. In other embodiments, the split command may designate each replica as belonging to one of more than two replica groups. Note that in some embodiments, the special "split" command may not require any special durability, while in others it may require the same durability as any other replicated write operation, or may have a different durability requirement than other replicated write operations.

As illustrated in this example, once the "split" command has been propagated and the new replica groups have been established, if the system is a single master system or a multi-master system, the method may include each of the new replica groups electing one or more masters for the replica group, as in 1150. Subsequently, the replicas in each of the new replica groups for the split partition (e.g., a replica group made up of the original replicas, a replica group made up of the destination replicas, or a replica group made up of any other subset of the resulting replicas for the split partition) may handle requests directed to a respective portion of the original partition, as in 1160. For example, each of the replicas may reject requests for the table data that is now out of its new smaller range, and may return an indication that the replica (or the node on which the replica is hosted) no longer hosts that data. As described above, in some embodiments, the system may be configured to perform a logical reclamation of the unused portions of the resulting split partition replicas, as in 1170. For example, as requests to store new items in the partition are received, these new items may be stored in locations in the table that (following the replica copying operation) held items stored in the original partition, but that are now being managed as part of a different partition (i.e. one of the two or more new partitions created by the split). In some embodiments, the system may employ a background process to logically free up space within each of the resulting partition replicas, but that space may be consumed later if more items are added to the table that are assigned to the new partition replicas according to their hash key attribute values and/or range key attribute values. In some embodiments, a physical memory reclamation operation may be performed, which may return a portion of the memory that was previously allocated to a large partition replica prior to the split to the operating system. In such embodiments, a de-fragmentation operation may also be performed.

Note that in some embodiments, information about a requested split operation may be added to database table, list, or other data structure that stores information about candidate partition management operations prior to the requested split operation being scheduled for execution. In such embodiments, a central partition management scheduler may be configured to schedule the requested split operation for execution according to a global prioritization scheme and in light of other pending partition management operations for which information is stored in the database table, list, or other data structure (e.g., other partition management operations requested by a client/user or system administrator, partition management operations initiated by the system in response to detecting an anomaly in the system, and/or candidate partition management operations that were identified by various storage nodes), as described herein.

As noted above, the partition moving process described above and illustrated in FIGS. 9 and 10, and the partition splitting process illustrated in FIG. 11 and described above may be initiated automatically (e.g., programmatically) in response to detection of an anomaly in a system that implements a data storage service, in some embodiments. For example, if a hot spot develops on a particular computing node or storage device in the system underlying the data storage service, the system may be configured to split a hot partition for which a replica is stored on that computing node or storage device and/or move one or more partition replicas stored on that computing node or storage device to another computing node or storage device.

In some embodiments, the data storage service (and/or underlying system) may be configured to detect anomalies in the system while servicing requests from one or more storage service clients. In some embodiments, the system may be configured to automatically (e.g., programmatically) respond to the detection of various types of anomalies, such as by scaling tables, moving partitions, splitting partitions, and/or taking other actions not described herein. For example, if a failed or faulty node (e.g., a computing node or storage device) has been detected, the system may be configured to replace the failed or faulty node with a new node and/or to move any or all partitions that are hosted on the failed or faulty node to the new node. As described herein, such a move may in some embodiments be performed using a physical copy operation. As previously noted, if a failed or faulty node hosted a partition replica that was a master for its replica group, the system may also be configured to elect a new master for the replica group subsequent to copying the partition to the new node.

If a hot spot or increasing table/partition size is detected, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if the system has detected that a best effort throughput target (or another user preference) is not being met or is in danger of not being met due to increasing traffic or if the data volume is increasing beyond a targeted capacity for the table, the system may be configured to throttle incoming service requests while attempting to correct the situation. Again, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if a live repartitioning operation (e.g., a partition splitting operation or a partition moving operation) is explicitly requested (e.g., by a table owner), the system may be configured to add or remove one or more partitions and corresponding replicas accordingly, or to move and/or split data that was hosted on a heavily loaded computing node or storage device in one or more partitions or replicas.

In general, once an anomaly has been detected and the system has responded to and/or returned an indicator of that anomaly, the system may resume (or continue) servicing incoming requests. In some embodiments, the system may be configured to continue operation (e.g., to continue servicing incoming service requests) until or unless additional anomalies are detected. If any additional anomalies are detected, any or all of the operations described above for resolving such anomalies may be repeated by the system in order to maintain and manage tables on behalf of data storage service clients.

Note that in some embodiments, any or all of the operations described above for resolving such anomalies may be performed pro-actively (and automatically) by background tasks while the data storage service is in operation, and may not necessarily be performed in response to receiving any particular service requests.

As previously noted, the systems described herein may provide storage services to clients, and may maintain data on behalf of clients in partitions that are replicated on multiple storage nodes. In some embodiments, these storage systems may implement a single master failover protocol. In some embodiments, membership in various replica groups may be adjusted through replicated changes, and membership and other updates in the system may be synchronized by synchronizing over a quorum of replicas in one or more data centers at failover time using a replicated quorum version. In some embodiments, a mechanism for splitting a partition may utilize failover quorum synchronization, external master locks, and/or various methods for detecting and resolving log conflicts, including log snipping (e.g., deleting log records that are on invalid branches). The systems may implement a fault-tolerant log shipping based replication mechanism that includes such log conflict detection and resolution. In some embodiments, log branching may be avoided through post-failover rejoins.

As described above, there may be various reasons why it may be beneficial to split a partition (or the replicas thereof) or to move one or more partitions or partition replicas to different storage nodes (or storage devices thereof). In some embodiments, the storage nodes of a distributed data storage system (e.g., one that provides database services to clients) may be configured to identify candidate partition management operations based on local conditions. For example, in some embodiments, each storage node may periodically query or examine all of its storage devices (e.g., disks or logical storage volumes) to determine what the current resource utilization is (e.g., to determine how much of the total capacity is provisioned for the use of various replicas on each of the storage devices). In other embodiments, the storage nodes may continually monitor the resource utilization for provisioned resources (e.g., using a background task).

In some embodiments, if a particular partition or partition replica gets too big (e.g., if it approaches or exceeds a target size or a threshold on the amount of resources it consumes), one or more of the partitions hosted on the storage node (or storage device) may be split into two or more partitions and/or one or more of the new partitions may be moved to another node/device. In another example, one of the partition replicas may be considered a candidate for being split or moved if the provisioned storage capacity or the provisioned throughput capacity for the storage node (or a storage device thereof) on which it is hosted reaches 80% of its total capacity, or if the partition replica itself reaches a predetermined absolute size threshold (e.g., 2 GB of provisioned storage). In some embodiments, there may be an upper watermark (e.g., on the order of 80%) that triggers a split or move operation, and a lower watermark (e.g., on the order of 60-70%) that serves as a target for the percentage of resources on a storage node (or device) that are provisioned for the use of various database tables at any given time. In such embodiments, the goal of the partition management operation may be to reduce the amount of provisioned resources to (or just below) the lower watermark, so that there is excess capacity available to handle future growth and/or temporary bursts in resource usage. For example, if disk utilization (in terms of provisioned capacity) is greater than 80% of the total capacity of a disk, a partition management operation may be performed to attempt to move enough partition replicas off the disk to reduce the disk utilization to 60%.

In some embodiments, determining which, if any, partition replicas to split or move may include determining a target amount by which to reduce a provisioned resource (e.g., storage capacity or throughput capacity) on one of the storage devices or logical storage volumes on which database partitions (or replicas thereof) are stored on a given storage node. In some such embodiments, the storage nodes (or storage devices themselves) may be configured to make local decisions about which of the partition replicas they host to split or move (and how), and to present their decisions to a central partition management scheduler component (e.g., a module of an administrative component of a distributed database system) as candidate partition management operations.

In some embodiments, one or more policies may be applied (e.g., by each of the storage nodes) to determine which partition replicas to move (and/or split) in a given candidate partition management operation. In some embodiments, multiple different policies (and corresponding partition management algorithms) may be applied, which yield different candidate partition management operations, and the storage node may determine which of the candidate partition management operations to forward on to the central partition management scheduler for consideration, according to another partition management policy. For example, in one embodiment, two or more of the following partition management algorithms may be applied to determine which replica (or replicas) to move (and/or split):

Sort the partition replicas on each storage device by their foot prints (e.g., in terms of storage capacity or provisioned throughput capacity), choose the smallest replica (the one with the fewest provisioned resources), and add it to a list of replicas to be moved to another storage device. If moving this replica would reduce the provisioned resource capacity for the storage device enough to meet the target for this partition management operation, the selection may be complete. Otherwise, the next smallest replica (or replicas) may be added, in turn, to the list of replicas to be moved in a candidate partition management solution until the target is met.

Sort the partition replicas on each storage device by their foot prints (e.g., in terms of storage capacity or provisioned throughput capacity), choose the largest replica (the one with the most provisioned resources), and add it to a list of replicas to be moved to another storage device. If moving this replica would reduce the provisioned resource capacity for the storage device enough to meet the target for this partition management operation, the selection may be complete. Otherwise, the next largest replica (or replicas) may be added, in turn, to the list of replicas to be moved in a candidate partition management solution until the target is met.

Identify the partition replica for which the provisioned resources are nearest in size to the target amount by which the resources are to be reduced, and add it to a list of replicas to be moved to another storage device. If moving this replica would reduce the provisioned resource capacity for the storage device enough to meet the target for this partition management operation (e.g., if the provisioned resources for this replica are the same as the target or exceed the target), the selection may be complete. Otherwise, one or more other partition replicas (e.g., those for which the provisioned resources are nearest in size to the remaining portion of the target amount by which the resources are to be reduced) may be added, in turn, to the list of replicas to be moved in a candidate partition management solution until the target is met.

Identify the partition replica for which the provisioned resources are nearest in size to the target amount by which the resources are to be reduced without exceeding the target amount, and add it to a list of replicas to be moved to another storage device. For example, if the target amount by which to reduce the provisioned resources is 30 GB, this algorithm may select a partition replica that has 25 GB of provisioned storage capacity to be moved, rather than one that has 32 GB of provisioned storage capacity. If moving this replica would reduce the provisioned resource capacity for the storage device enough to meet the target for this partition management operation (e.g., if the provisioned resources for this replica are the same as the target), the selection may be complete. Otherwise, one or more other partition replicas (e.g., those for which the provisioned resources are nearest in size to the remaining portion of the target amount by which the resources are to be reduced without exceeding it) may be added, in turn, to the list of replicas to be moved in a candidate partition management solution until the target is met.

In various embodiments, each storage node may (e.g., periodically, or in response to a query from a central partition management scheduler) apply one or more of these policies/algorithms to its storage devices (e.g., its disks or logical storage volumes), or the storage devices may apply these policies/algorithms themselves. In embodiments in which multiple approaches are applied for managing (or correcting) storage capacity issues and/or throughput capacity issues through repartitioning (e.g., through one or more partition splitting and/or partition moving operations), and those approaches yield different partition management solutions, each storage node may select a local partition management solution for a particular storage device (from among the multiple solutions) that minimizes the amount of work to be performed and/or the impact of the solution on the system performance or the client experience (customer or client application), and may return information about the selected solution to the central partition management scheduler as a candidate partition management operation. For example, if a storage node (or storage device) applies two or more of the policies/algorithms described above and each suggests a different partition management solution, the storage node may be configured to select the partition management solution that affects the fewest partitions (e.g., the solution that moves the fewest partition replicas), or (if two or more solutions each affect the same number of partitions), the partition management solution that affects the fewest resources (e.g., the solution that moves the replica(s) having the least amount of provisioned storage or throughput resource capacity). In other words, in some embodiments, due to the way provisioned resources are distributed among different partition replicas, moving the same number of partition replicas might not move the same amount of provisioned resource capacity (e.g., some partition replicas may be smaller than others and/or require less provisioned throughput capacity).

Note that there may not be pending candidate partition management operations for all storage nodes each time they are queried by the central partition management scheduler. Therefore, the storage nodes may return information about one or more candidate partition management operations only when they identify a need for a partition management operation. As described above, any of these partition management techniques may be applied to manage or correct issues involving storage capacity and/or throughput capacity (e.g., the same partition management technique(s) may be applied when managing partitioning for storage capacity or for throughput capacity, or different ones of these or other partition management techniques may be applied when managing partitioning for storage capacity than are applied when managing partitioning for throughput capacity). Also note that, at any given time, the utilization of one type of provisioned resource (e.g., throughput capacity) may be acceptable (e.g., it may fall within a range defined by an upper and lower threshold), but the utilization of another type of provisioned resource (e.g., storage capacity) might not be acceptable, thus triggering one or more partition management operations. At other times, the utilization of multiple types of provisioned resources may be acceptable or unacceptable.

In one example, if the rate of input/output operations that a particular storage device is expected (and configured) to be able to handle (e.g., its provisioned capacity) is 1000 write operations per second (1000 IOPS for writes), and the storage device hosts 10 partition replicas, the storage device may in some embodiments provision 100 IOPS for writes for each partition replica. In other embodiments, the provisioned throughput capacity may not be divided equally among the partition replicas hosted on a given storage device. Note that in some embodiments (including in many of those in the examples described herein), the selection of partition replicas to be split or moved may be performed based on the provisioned resource capacity of each of the partition replicas, rather than the actual resource capacity being used by each of the partition replicas. In other embodiments, techniques similar to those described herein may be applied to the selection of partition replicas to be split or moved based on the actual resource capacity being used by each of the partition replicas. Also note that, in some embodiments, a pre-determined tolerance level may specify a threshold or limit on the number of partitions and/or the amount of provisioned resource capacity that can be affected by a single candidate partition management solution or by all partition management operations being performed substantially concurrently (e.g., during the same time period or overlapping time periods), which may influence the selection of partition replicas to be split or moved (e.g., this may influence the selection of a partition management solution from among multiple partition management solutions, as described above).

Figure 12:
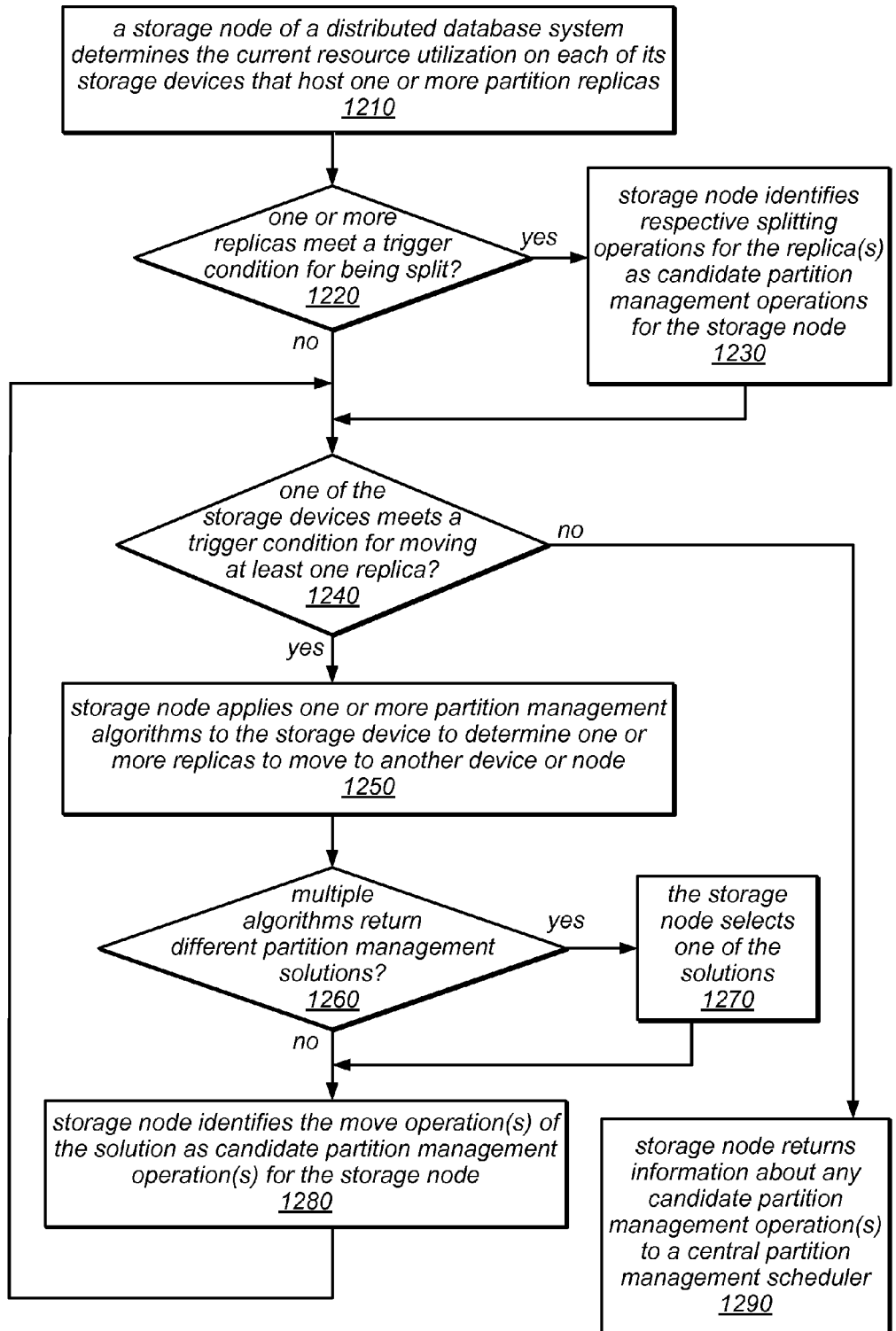
FIG. 12 is a flow diagram illustrating one embodiment of a method for making a local recommendation for a partition management operation on a storage node.

One embodiment of a method for making a local recommendation for a partition management operation on a storage node is illustrated by the flow diagram in FIG. 12. As illustrated at 1210, in this example, the method may include a storage node of a distributed database system determining the current resource utilization on each of its storage devices that host one or more partition replicas. For example, the storage node may determine the total amount (or percentage) of the storage resource capacity or throughput capacity of each of the storage devices that is provisioned for the use of the partition replicas, or may determine the amount (or percentage) of the storage resource capacity or throughput capacity of each of the storage devices that is provisioned for the use of each of the partition replicas, individually, If one or more of the partition replicas meet a trigger condition for being split (e.g., in terms of their provisioned storage capacity and/or provisioned throughput capacity) shown as the positive exit from 1220, the method may include the storage node identifying respective splitting operations for the replica(s) as candidate partition management operations for the storage node, as in 1230. If none of the partition replicas meet such a trigger condition (shown as the negative exit from 1220), the operation illustrated at 1230 may be skipped.

As illustrated in this example, if one of the storage devices meets a trigger condition for moving at least one partition replica stored on the storage device (e.g., in terms of provisioned storage capacity and/or provisioned throughput capacity), shown as the positive exit from 1240), the method may include the storage node applying one or more partition management algorithms to the storage device (e.g., to various measures of the resource utilization on the storage device) to determine one or more partition replicas to move to another storage device or storage node, as in 1250. For example, each of the partition management algorithms may identify one or more partition replicas that, if moved, would reduce the provisioned resource capacity on the source storage device to an acceptable level (e.g., to a level within a target resource utilization range).

As illustrated in this example, if multiple partition management algorithms are applied and they return different partition management solutions (shown as the positive exit from 1260), the method may include the storage node selecting one of the solutions, as in 1270. For example, the storage node may select one of the solutions using any of the techniques described herein or another suitable technique. Otherwise (e.g., if only one partition management algorithm was applied or if multiple partition management algorithms return the same solution), there may be no need to perform the selection operation illustrated at 1270. As described herein, a single partition management solution may involve moving two or more partition replicas to different storage devices or storage nodes. As illustrated in FIG. 12, the method may include the storage node identifying the move operation(s) of the solution as candidate partition management operation(s) for the storage node, as in 1280. The method may also include repeating the operations illustrated as 1240-1280 in an attempt to identify any additional candidate partition management operations for storage devices that meet the trigger condition for moving at least one partition replica. This is illustrated in FIG. 12 by the feedback from 1280 to 1240.

As illustrated in this example, once there are no more trigger conditions met for moving at least one partition replica, or if none of the storage devices meet a trigger condition for moving a partition replica (shown as the negative exit from 1240), the method may include the storage node returning information about any candidate partition management operation(s) to a central partition management scheduler, as in 1290.

In various embodiments, the information sent to the central partition management scheduler about each of the candidate partition management operations may include any or all of the following: an identifier of the candidate partition management operation, an identifier of each of one or more split operations or move operations, an identifier of the storage node and/or storage device that is the target of the partition management operation, an identifier of the operation type (indicating, e.g., whether the operation includes a partitioning splitting operation, a partition moving operation to manage a storage capacity issue, or a partition moving operation to manage a throughput capacity issue, and/or whether the partition management operation was requested by a client or initiated automatically by the system), the number of partition replicas that would be affected by the partition management operation, identifiers of each of the affected partition replicas, the amount of resources provisioned by each of the affected replicas, or any other information usable in identifying, evaluating, prioritizing, and/or scheduling the performance of candidate partition management operations. As previously noted, in some embodiments, this information may be generated and/or returned to the central partition management scheduler in response to a periodic query for candidate partition management operations. For example, in some embodiments, each of the storage nodes may initiate an operation to identify any candidate partition management operations periodically (e.g., with the same frequency as the queries from the central partition management scheduler or with a different frequency) or on an as-needed basis (e.g., in response to detecting a failure or other anomaly in the system or in response to detecting that a partition replica or storage device is approaching or has exceeded a trigger condition for partition management operations), and may store information about the identified candidate partition management operations to be sent to the central partition management scheduler at a later time (e.g., in response to a periodic query).

As previously noted, in some embodiments, a central partition management scheduler may be configured to query (e.g., periodically) each storage node to request information about any candidate partition management operations that have been identified by the storage node (e.g., any operations to split or move one or more partition replicas hosted on the storage node). In some embodiments, other candidate partition management operations may be introduced to the central partition management scheduler through an explicit request from a customer or a client application (e.g., through a GUI or API). In some embodiments, the storage nodes may perform an analysis in response to that query and return any candidate partition management operations (if needed). As noted above, in other embodiments, the storage nodes may perform such an analysis periodically or in response to detecting an anomaly in the storage node (e.g., a full or nearly full disk), a request to increase throughput capacity for a table beyond what is available under various resource utilization constraints, limitations, or policies (through, e.g., an UpdateTable operation initiated by a customer of by client software), an increase in the size (or the requested size) of a table, higher than expected throttling, or any of various error conditions.

As noted above, in some embodiments each of the storage nodes of a distributed database system (or each of the storage devices thereof) may be configured to make local decisions about which of the partition replicas they host to split or move (and how), and to present their decisions to a central partition management scheduler component as candidate partition management operations. In such embodiments, the central partition management scheduler may then determine if and when to perform (or initiate the execution of) each of the candidate partition management operations about which it receives information from the storage nodes (or storage devices). In other words, a centralized partition management scheduler may be configured to determine which candidate partition management operations to schedule (and the order in which to schedule them), e.g., according to a global prioritization policy.

In some embodiments, the central partition management scheduler (or another component of an administrative module of the distributed database system) may maintain a database table (or list) that stores information about candidate partition management operations. As information is received by the central partition management scheduler (e.g., from one of the storage nodes or from a customer/client), it may be stored in this table or list for subsequent evaluation and/or scheduling. For example, each table entry or list element may identify one or more partition replicas to be split (e.g., due to storage and/or throughput capacity issues), one or more partition replicas to be moved based on storage capacity issues and/or one or more partition replicas to be moved based on throughput capacity issues. In some embodiments, each entry or element (which may also be referred to as a "partition management event") may include an indication of the state of the corresponding partition management operation. For example, when a new entry for a candidate partition management operation is added to the table (or list), its status may be set to "pending". When and if the candidate partition management operation is selected and/or scheduled for execution, its status may be changed to "active". In this example, once the partition management operation has been completed, its status may be changed to "complete" or the entire entry may be removed from the list.

In some embodiments, the central partition management scheduler may scan the table or list of candidate partition management operations (e.g., periodically) to select one or more candidate partition management operations to schedule for performance (e.g., to initiate the execution of the candidate partition management operation), based on a pre-determined global prioritization scheme (e.g., an approach that determines the relative priorities of pending candidate partition management operations across multiple targeted storage nodes and/or storage devices in the distributed database system). In some embodiments, the central partition management scheduler may (e.g., during a given scheduling exercise) select multiple candidate partition management operations to be performed substantially concurrently (e.g., if two or more can be scheduled without conflicts and/or without exceeding a pre-determined upper limit on the number or percentage of replicas that can be involved in partition management operations at the same time). In some embodiments, partition splitting operations and/or partition moving operation may be performed by a background process, and such constraints or limits may be applied to avoid having the partition management operations interfere too much with any concurrently executing foreground processes that service customer requests.

For example, in some embodiments, a global partition management policy may specify that no more than a pre-determined maximum number or percentage of the partition replicas in the distributed database (e.g., no more than 100 partition replicas, or no more than 25% of the partition replicas) can be involved in a partition management operation at the same time. In other embodiments, a global partition management policy may specify that multiple partition splitting operations cannot be performed on the same storage node at the same time (e.g., that split operations cannot be performed on two different source partitions that are hosted on the same node concurrently or with a significant overlap in time).

In some embodiments, a pre-determined global partition management policy may specify that the central partition management scheduler should schedule partition management operations that include partition splitting operations with a higher priority than those that involve partition moving operations. For example, partition splitting operations may be given higher priority than partition moving operations in systems in which delaying a recommended partition splitting operation is likely to have a bigger impact on the customer/client than delaying a recommended partition moving operation (e.g., if the situation is in danger of reaching a critical point that could affect durability of the partition data). In such embodiments, the central component may not schedule the performance of a partition management operation that involves a move operation (but does not involve a split operation) while there are any partition management operations that involve split operations in the list of candidate partition management operations. In some embodiments, a pre-determined global partition management policy may specify that the central partition management scheduler should schedule partition moving operations that were triggered by a desire to manage and/or correct storage capacity issues with a higher priority than partition moving operations that were triggered by a desire to manage and/or correct throughput capacity issues. For example, in some embodiments, if a given storage device (e.g., a disk) is in danger of running out of space, a partition replica hosted on that storage device may not be able to grow to meet future needs or higher than expected storage capacity utilization, which could affect (at least in the short term) the ability to service customer requests directed to that partition replica at all. By contrast, a shortage of throughput capacity for a partition replica may be considered more of a performance (rather than correctness) issue, in some embodiments.

In some embodiments, the central partition management scheduler may be configured to attempt to schedule as many split operations as it can, given any constraints such as those described above for avoiding conflicts and/or interference with foreground processes. As previously noted, in some embodiments there may be a pre-determined limit on the number or percentage of storage nodes or partition replicas that can be involved in a respective partition management operation at a time (e.g., 100 storage nodes). In one example, a central partition management scheduler may identify five split operations in the list of candidate partition management operations that do not conflict with each other and that (collectively) do not affect more storage nodes (or partition replicas) than a pre-determined maximum number of nodes (or partition replicas) that can be involved in partition management operations at one time. In this example, once no additional splits can be scheduled (due to these or other constraints), one or more move operations for reducing provisioned storage capacity may be scheduled, followed by one or more operations for reducing provisioned throughput capacity, until or unless such limits are reached.

In some embodiments, the central partition management scheduler may include two components. For example, the central partition management scheduler may include a periodic sweeper component (or module) and an event scheduler component (or module). In this example, the periodic sweeper may request and receive information from various storage nodes about candidate partition management operations or may identify candidate partition management operations based on information received from storage nodes. The periodic sweeper may also store information about each of the candidate partition management operations in a database table in the system as an individual item or partition management event. In this example, the event scheduler may select various partition management operations (events) to work on (e.g., it may initiate the performance of selected candidate partition management operations) at which point it may change the indications of their states from "pending" to "active".

Figure 13:
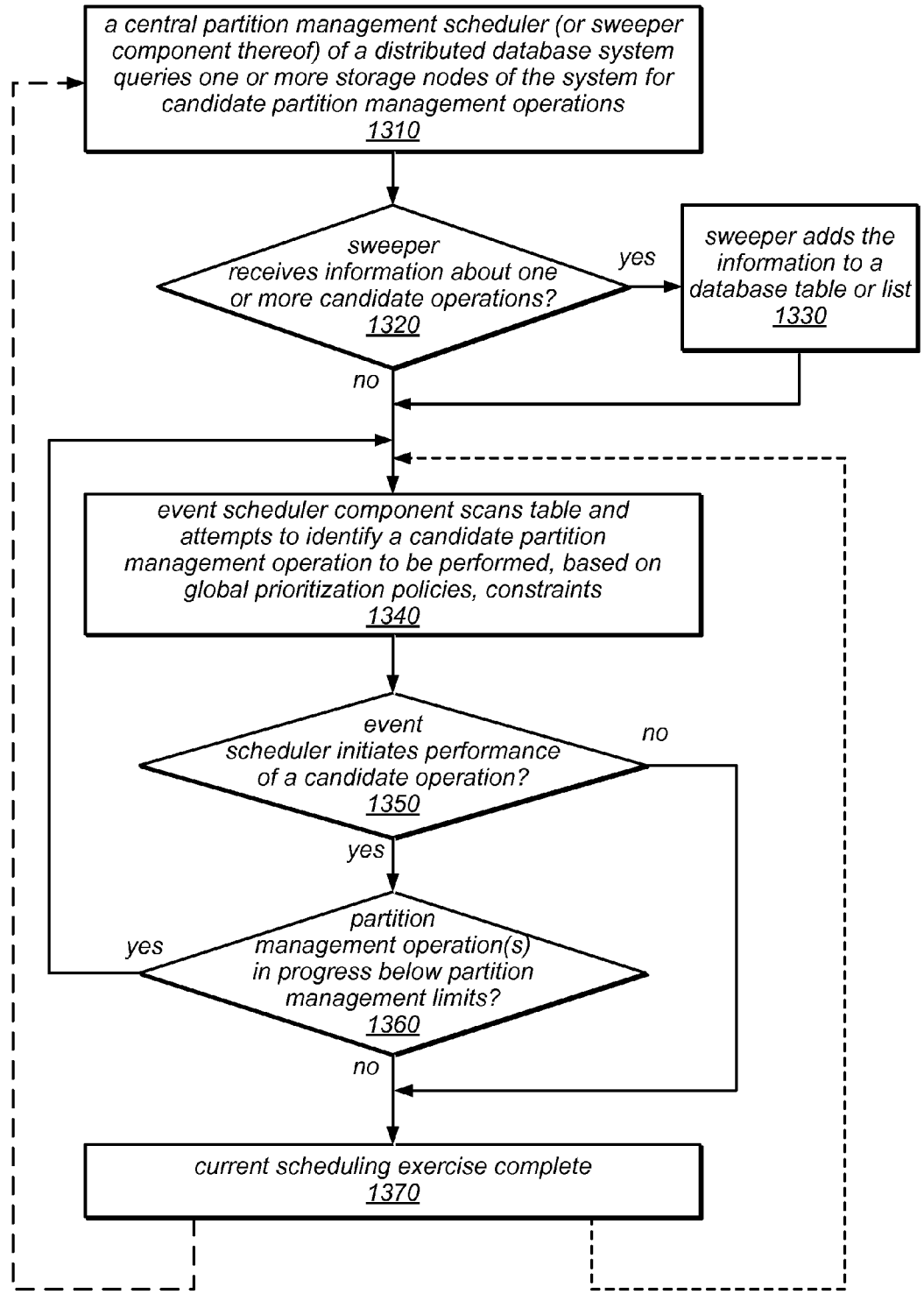
FIG. 13 is a flow diagram illustrating one embodiment of a method for selecting candidate partition management operations to be executed.

One embodiment of a method for selecting candidate partition management operations to be executed is illustrated by the flow diagram in FIG. 13. As illustrated at 1310, in this example, the method may include a central partition management scheduler (or a sweeper component/module thereof) of a distributed database system (which may be a component of an auto admin module) querying one or more storage nodes of the system for candidate partition management operations (e.g., periodically). If the central partition management scheduler receives information about one or more candidate partition management operations (e.g., from various ones of the storage nodes), shown as the positive exit from 1320, the method may include the central partition management scheduler (e.g., the sweeper component/module of the partition management scheduler) adding the information to a database table or list of candidate partition management operations, as in 1330. For example, the database table or list may or may not already store information about other pending candidate partition management operations. If no information about candidate partition management operations is received, shown as the negative exit from 1320, the operation illustrated at 1330 may be skipped.

As illustrated in this example, the method may include the central partition management scheduler (or an event scheduler component/module thereof) scanning the database table (or list) and attempting to identify a candidate partition management operation to be performed, based on one or more global prioritization policies and/or constraints, as in 1340. For example, the central partition management scheduler (or event scheduler thereof) may be configured to e.g., schedule a split (if possible), until you can't schedule any more splits (due to constraints), then schedule one or more move operations to manage or correct storage capacity issue (if possible) until you can't schedule any more (due to constraints), then schedule one or more move operations to manage or correct throughput capacity issue (if possible) until you can't schedule any more (due to constraints)

As illustrated in this example, if the central partition management scheduler (or event scheduler thereof) initiates performance of a candidate operation (shown as the positive exit from 1350), and if the partition management operation(s) in progress are below various applicable partition management operation limits (e.g., in terms of the number of replicas involved in the partition management operations in progress or the amount of resource capacity provisioned for the replicas involved in those operations), the method may include repeating the operations illustrated as 1340-1360, until such partition management operation limits are reached. This is illustrated in FIG. 13 by the feedback from the positive exit of 1360 to 1340. In other words, if the central partition management scheduler (or event scheduler thereof) is able to identify a candidate partition management operation that meets the currently applicable constraints, it may initiate the performance of that candidate partition management operation and may continue scanning the table for other candidate partition management operations to schedule for performance, within the applicable partition management operation limits.

As illustrated in this example, once there are no candidate partition management operations in the table that are suitable for performance (e.g., due to various partition management operation limits and/or constraints), the current scheduling exercise may be complete, as in 1370. Note that in some embodiments, the central partition management scheduler may run continuously (e.g., as a background process) and may keep checking the table of candidate partition management operations to determine whether it can schedule more partition management operations (e.g., as others are completed) and/or may gather more candidate operations from various storage nodes (e.g., by querying the storage nodes once every five minutes or on another periodic interval). This is illustrated in FIG. 13 by the dashed lines from 1370 to 1340 and from 1370 to 1310, respectively.

In some embodiments, when scanning the list of candidate partition management operations to select one or more operations to be performed, the central partition management scheduler (or event scheduler thereof) may examine the candidate partition management operations in the list in the order in which they were received and/or stored to identify the highest priority candidate partition management operation types. For example, in embodiments in which partition splitting operations are given higher priority than partition moving operations, the central partition management scheduler (or event scheduler thereof) may scan the list until it encounters a split type operation, which it may schedule for execution, and then may continue scanning the list in search of additional split type operations, each of which it may schedule for execution as it is encountered. Once no additional split type operations are found, the central partition management scheduler (or event scheduler thereof) may scan the list until it encounters a move type operation, which it may schedule for execution, and so on.

In other embodiments, the central partition management scheduler (or event scheduler thereof) may apply different or additional sort criteria to the list of candidate partition management operations as part of its search for candidate partition management operations to schedule for performance, e.g., to determine the relative priority of candidate partition management operations of the same type. For example, in some embodiments, the central partition management scheduler (or event scheduler thereof) may first scan the list to identify the split type operation (from among two or more split type operations) that targets the largest partition replica (e.g., in terms of provisioned storage capacity or provisioned throughput capacity), after which it may scan the list to identify the split type operation that targets the next largest partition replica, and so on. In this example, once all split type operations have been scheduled for execution, the central partition management scheduler (or event scheduler thereof) may scan the list to identify the move type operation (from among two or more move type operations) that targets the largest partition replica (e.g., in terms of provisioned storage capacity or provisioned throughput capacity), after which it may scan the list to identify the move type operation that targets the next largest partition replica, and so on. In some embodiments, the central partition management scheduler (or event scheduler thereof) may consider both storage capacity issues and throughput capacity issues (in combination) when selecting candidate partition management operations to schedule for performance. For example, if a particular partition replica is involved in candidate move operations based on both a storage capacity issue and a throughput capacity issue, movement of the partition replica may be prioritized first based on the move to address the storage capacity issue (e.g., based on the amount of provisioned storage capacity to be affected by the move) and then (from among two or more move operations that target partition replicas of the same size) it may be prioritized based on the move to address the throughput capacity issue. Note that in some embodiments, if a partition replica needs to be split (and is a target of a candidate partition management operation to split the partition replica), it cannot also be considered as a target for a candidate partition management operation to move the partition replica.

Figure 14:
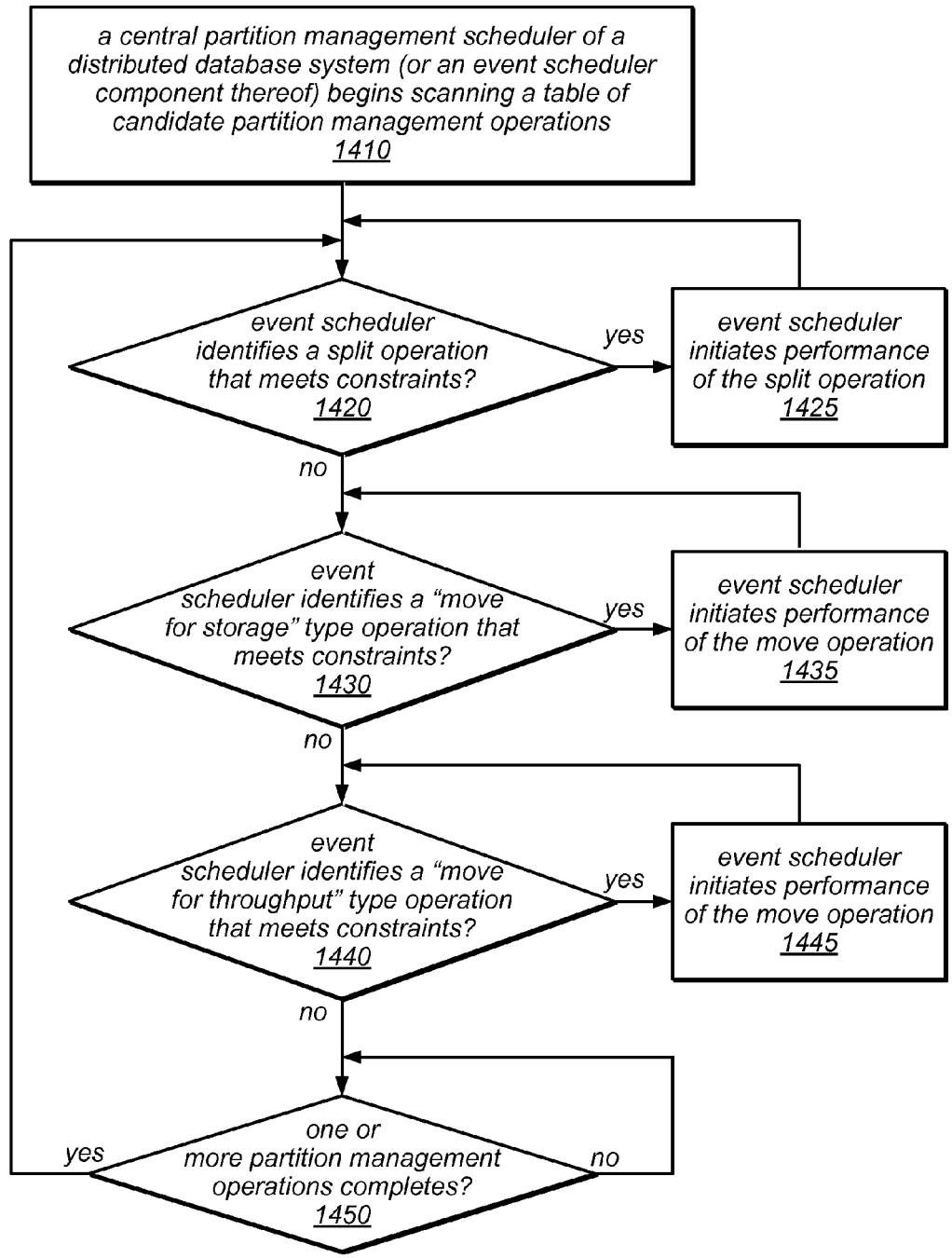
FIG. 14 is a flow diagram illustrating one embodiment of a method for prioritizing candidate partition management operations by type.

One embodiment of a method for prioritizing candidate partition management operations by type is illustrated by the flow diagram in FIG. 14. As illustrated at 1410, in this example, the method may include a central partition management scheduler of a distributed database system (or an event scheduler thereof) beginning to scan a table of candidate partition management operations. If the central partition management scheduler (or event scheduler thereof) identifies a split operation that meets various applicable constraints (shown as the positive exit from 1420), the method may include the central partition management scheduler (or event scheduler thereof) initiating performance of the split operation, as in 1425. For example, a split operation encountered during a scan of the table may be scheduled for execution if it does not conflict with other partition management operations that have already been scheduled for execution (e.g., partition management operations that are currently in progress), and if it would not cause the system to exceed a pre-determined limit on the total number of replicas or the total amount of resources that are involved in partition management operations. As illustrated in this example, the method may include the central partition management scheduler (or event scheduler thereof) attempting to identify one or more additional split operations in the table of candidate partition management operations that meet the applicable constraints and that can, for this and/or other reasons, be scheduled for execution. This is illustrated in FIG. 14 as the feedback from 1425 to 1420.

If the central partition management scheduler (or event scheduler thereof) is not able to identify a split operation that meets the applicable constraints (or once there are no additional split operations that meet the constraints), shown as the negative exit from 1420, the method may include determining whether there are any "move for storage" type operations among the candidate partition management operations that meet constraints. In other words, the method may include determining whether there are any candidate partition management operations in the table of candidate partition management operations that include operations to move one or more partition replicas from a given storage device or node to another storage device or node in order to reduce the amount of provisioned storage capacity on the given storage device or node, as in 1430. If the central partition management scheduler (or event scheduler thereof) identifies a "move for storage" type operation that meets the applicable constraints, shown as the positive exit from 1430, the method may include the central partition management scheduler (or event scheduler thereof) initiating the performance of the move operation, as in 1435. As illustrated in this example, the method may include the central partition management scheduler (or event scheduler thereof) attempting to identify one or more additional "move for storage" type operations in the table of candidate partition management operations that meet the applicable constraints and that can, for this and/or other reasons, be scheduled for execution. This is illustrated in FIG. 14 as the feedback from 1435 to 1430.

If the central partition management scheduler (or event scheduler thereof) is not able to identify a "move for storage" type operation that meets the applicable constraints (or once there are no additional "move for storage" type operations that meet the constraints), shown as the negative exit from 1430, the method may include determining whether there are any "move for throughput" type operations among the candidate partition management operations that meet constraints. In other words, the method may include determining whether there are any candidate partition management operations in the table of candidate partition management operations that include operations to move one or more partition replicas from a given storage device or node to another storage device or node in order to reduce the amount of provisioned throughput capacity on the given storage device or node, as in 1440. If the central partition management scheduler (or event scheduler thereof) identifies a "move for throughput" type operation that meets the applicable constraints, shown as the positive exit from 1440, the method may include the central partition management scheduler (or event scheduler thereof) initiating the performance of the move operation, as in 1445. As illustrated in this example, the method may include the central partition management scheduler (or event scheduler thereof) attempting to identify one or more additional "move for throughput" type operations in the table of candidate partition management operations that meet the applicable constraints and that can, for this and/or other reasons, be scheduled for execution. This is illustrated in FIG. 14 as the feedback from 1445 to 1440.

As illustrated in this example, if the central partition management scheduler (or event scheduler thereof) is not able to identify a "move for throughput" type operation that meets the applicable constraints (or once there are no additional "move for throughput" type operations that meet the constraints), shown as the negative exit from 1440, the method may include determining whether any partition management operations have completed execution, as in 1450. If not, shown as the negative exit from 1450, the method may include waiting until one or more partition management operations have been completed before attempting to schedule any other candidate partition management operations for execution. This is illustrated in FIG. 14 by the feedback from the negative exit of 1450 back to 1450. In other words, if no other candidate partition management operations can be scheduled for execution within the applicable constraints or limits, there may be no point in continuing to scan the table of candidate partition management operations until or unless one of the previously scheduled partition management operations is completed. If (or once) one or more partition management operations have been completed, shown as the positive exit from 1450, the method may include repeating the operations illustrated in 1420-1450 in an attempt to identify additional candidate partition management operations for execution. Note that, in some cases, additional candidate partition management operations may have been added to the table of candidate partition management operations since the scanning operation began (e.g., at 1410), if additional candidate partition management operations have been identified by the storage nodes or the central partition management scheduler (or sweeper component/module thereof), or have been requested by a customer/client in the meantime.

In some embodiments, a partition management operation scheduling process (e.g., an event scheduler) may run on the central component continuously (e.g., as a background process) and may initiate the performance of various candidate partition management operations (e.g., using a global prioritization scheme) whenever it is possible to do so (according to applicable policies, limits, or constraints). In some embodiments, a central partition management scheduler (or a sweeper component/module thereof) may automatically query the storage nodes periodically (e.g., once every five minutes) and/or when a partition management operation scheduling exercise is invoked by another management process (e.g., a resource allocation/balancing process).

Note that in some embodiments, multiple storage nodes may hold replicas of the same partition and two or more of them may present information to the central partition management scheduler indicating that the partition should be split. In some embodiments, a single partition management operation may be added to the list to indicate that the partition should be split, which may affect all of the replicas of that partition, regardless of the storage nodes or storage devices on which they are hosted).

For example, the central partition management scheduler may, when receiving a candidate partition management operation from one of the storage nodes on which the replicas of a given partition are stored, determine that a candidate partition management operation for that partition already exists in the list of candidate partition management operations and may not add another candidate partition management operation entry to the list for that partition. In other words, the central partition management scheduler may perform a de-duplication for the candidate partition management operations on the list as the candidate partition management operations are added to the list (or at another time, e.g., when subsequently scanning the list).

Note that in some embodiments, if the central partition management scheduler (or a sweeper or scheduler component/module or process thereof) fails (e.g., if the node on which it executes fails or becomes unreachable), another instance of the central partition management scheduler (or a sweeper or scheduler module/component or process thereof) may be created and may take over (e.g., restart) these processes (e.g., adding to and/or operating on the data stored in the database table to select and schedule candidate partition management operations in the distributed database system).

In some embodiments, local partition management decisions (e.g., those made on the storage nodes and/or by the central partition management scheduler, or a sweeper component/module thereof, to identify candidate partition management operations) and/or global prioritization decisions (e.g., those made by the central partition management scheduler, or an event scheduler thereof, to determine the relative priorities of candidate partition management operations) may be based on a balancing process, rather than (or in addition to) various threshold-based processes (e.g., those based on an upper limit and/or a lower target for provisioned resource capacity utilization). In such embodiments, a goal of the local partition management decisions and/or global prioritization decisions may be to maintain a balance between various machines, storage nodes and/or storage devices in terms of throughput capacity and/or disk utilization (e.g., within some range centered around an average utilization). For example, in some embodiments, these processes may be configured to periodically compute an average resource utilization for various machines, storage nodes and/or storage devices in terms of throughput capacity and/or disk utilization and to identify one or more candidate partition management operations that, if performed, may cause the resource utilization on each of those machines, storage nodes and/or storage devices to be within a desired distance of the average resource utilization (e.g., by defining upper and/or lower resource utilization thresholds centered on the average resource utilization).

Note that in some embodiments, a central partition management scheduler (or event scheduler thereof) may consider all candidate partition management operations in the same class as having equal priority (other than if those that would result in conflicts).

In other embodiments, candidate partition splitting operations or candidate partition moving operations in the same classes may be further prioritized within those classes. For example, in some embodiments, split operations or move operations that were explicitly requested by a client (e.g., by a customer through a GUI or by a client application through an API) may be given higher priority than candidate partition management operations in the same classes that were determined programmatically by the system. In another example, split operations or move operations within a given class may be prioritized by the sizes of the affected partitions and/or by the rate at which the affected partitions are growing (e.g., in terms of provisioned storage or throughput capacity). For example, a candidate move operation for a partition replica hosted on a disk that is 95% full (e.g., for which 95% of its storage capacity has been provisioned for the use of one or more partition replicas) may be considered more critical (and therefore higher priority) than a candidate move operation for a partition replica hosted on a disk that is 90% full, or 85% full. In other words, candidate partition management operations involving partition replicas, storage nodes, or storage devices for which a threshold that triggers a split or move operation is greatly exceeded may be given higher priority than those involving partition replicas, storage nodes, or storage devices for which a threshold that triggers a split or move operation is exactly met or is barely exceeded.

Note that while many of the examples herein describe embodiments in which a central partition management scheduler (or event scheduler thereof) performs prioritization and/or scheduling for multiple candidate partition management operations nominated by various ones of a plurality of storage nodes, in other embodiments a central component (rather than the storage nodes) may also be configured to determine the candidate partition management operations. For example, in some embodiments, storage nodes may send resource utilization data to the central partition management scheduler or a sweeper component/module thereof (e.g., periodically), and the central partition management scheduler (or sweeper component/module) may make the storage-node-level decisions about which, if any, partition moving operations or partition splitting operations should be performed on each storage node and/or device (e.g., using any of the techniques described herein and/or any other suitable techniques). In such embodiments, the central partition management scheduler may add information about these identified partition management operation candidates to a table (or list) of candidate partition management operations and may determine an order in which they should be performed, as described above. In other embodiments, the central partition management scheduler may apply the techniques described herein for identifying candidate partition management operations across multiple storage nodes and/or storage devices, rather than on a storage node or storage disk basis.

Figure 15:
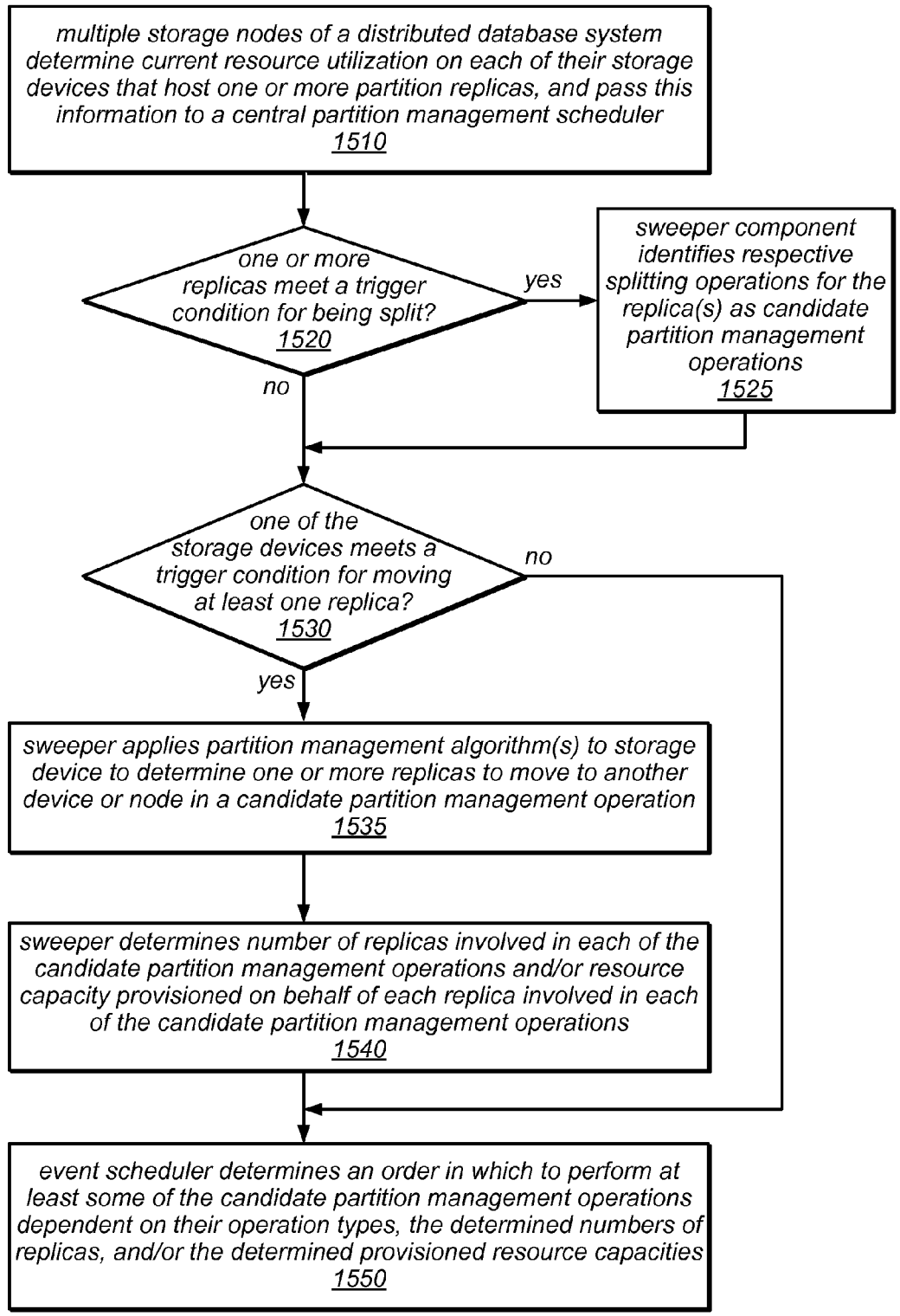
FIG. 15 is a flow diagram illustrating one embodiment of a method for identifying candidate partition management operations, and then scheduling them for execution, in a central partition management scheduler.

One embodiment of a method for identifying, and then scheduling, candidate partition management operations in a central partition management scheduler is illustrated by the flow diagram in FIG. 15. As illustrated at 1510, in this example, the method may include multiple storage nodes of a distributed database system determining the current resource utilization on each of their storage devices that host one or more partition replicas, and passing this information to a central partition management scheduler (or to a sweeper component/module thereof). If one or more partition replicas meet a trigger condition for being split (shown as the positive exit from 1520), the method may include the central partition management scheduler (or sweeper component/module thereof) identifying respective splitting operations for the replica(s) as candidate partition management operations, as in 1525. If none of the partition replicas meet a trigger condition for being split (shown as the negative exit from 1520), the operation illustrated at 1525 may be skipped.

As illustrated in this example, if one of the storage devices meets a trigger condition for moving at least one replica (shown as the positive exit from 1530), the method may include the central partition management scheduler (or sweeper component/module thereof) applying one or more partition management algorithms to the storage device (e.g., to various measures of the resource utilization on the storage device) to determine one or more replicas to be moved to another device or node in a candidate partition management operation, as in 1535.

As illustrated in FIG. 15, the method may include the central partition management scheduler (or a sweeper component/module thereof) determining the number of replicas involved in each of the candidate partition management operations and/or the resource capacity provisioned on behalf of each of the replicas involved in each of the candidate partition management operations, as in 1540. The method may also include the central partition management scheduler (or an event scheduler thereof) determining an order in which to perform at least some of the candidate partition management operations dependent on their operation types, the determined numbers of replicas, and/or the determined provisioned resource capacities, as in 1550, e.g., using any of the techniques described herein for making such a determination.

Figure 16:
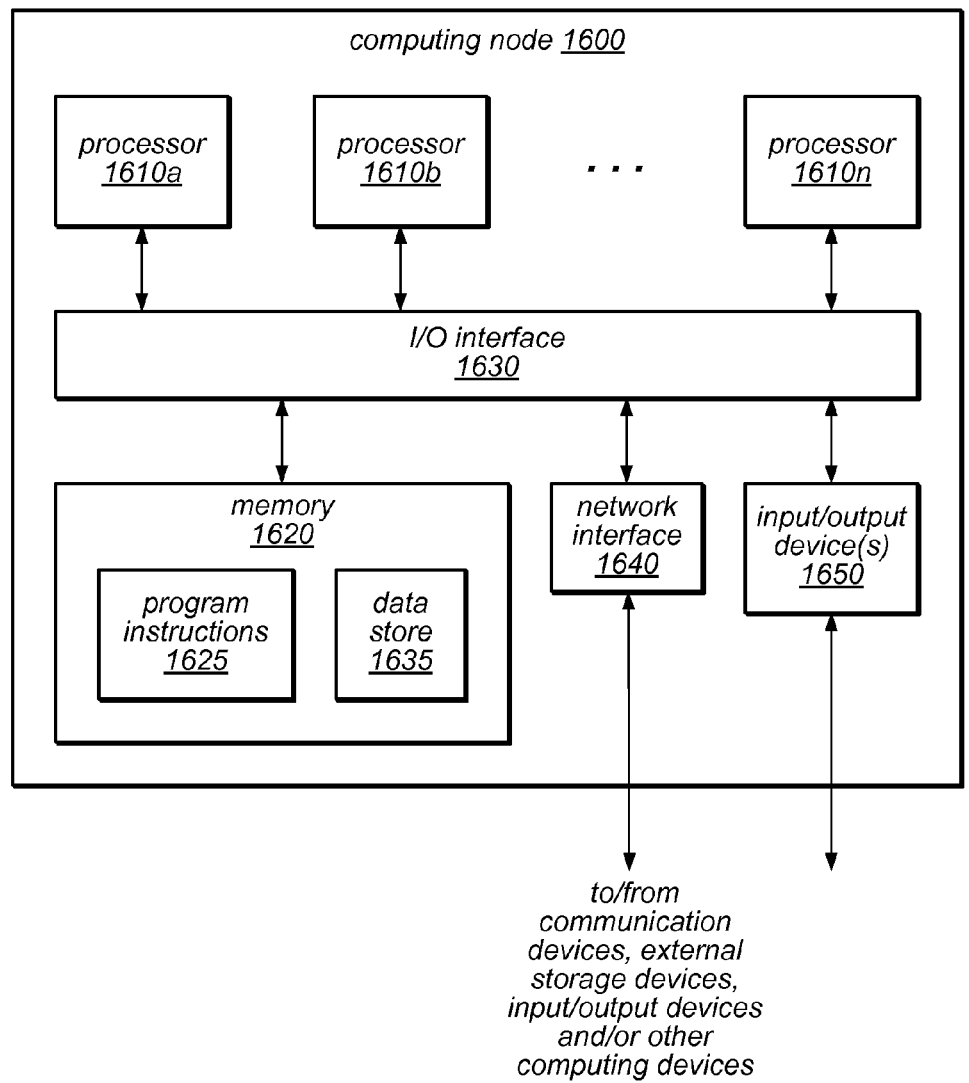
FIG. 16 is a block diagram illustrating a computing node that implements one or more of the techniques described herein for managing partitions of various tables and/or scheduling partition management operations in a distributed database system, according to various embodiments.

One embodiment of a computing node that implements one or more of the techniques described herein for managing partitions of various tables and/or scheduling partition management operations in a distributed database system is illustrated by the block diagram in FIG. 16. Computing node 1600 may include functionality to provide any or all of the components of a system that implements such a data storage service, or multiple computing nodes similar to or different from computing node 1600 may collectively provide this functionality, in different embodiments. For example, in various embodiments, one or more computing nodes 1600 may implement any number of storage service clients 310, a front end module 340, any number of auto admin instances 350, any number of storage devices (such as storage node instances 360), and/or any other components of a Web services platform 330, an auto admin cluster, or external resources that interact with Web services platform 330 (such as external workflow component 370). Any number of those storage node instances 360 may each host one or more replicas of various data partitions and/or metadata associated therewith. For example, any given storage node instance 360 may host a replica acting as master replicas for its replica group and/or a replica acting as a slave replica in its replica group. In various embodiments, any or all of the techniques described herein for performing partitioning, repartitioning (e.g., through partition splitting and/or partition moving), replication, and/or otherwise managing partition data may be performed by one or more components of the storage node instances 360 that host a master replica and/or a slave replica, such as partition manager 470 and replication and failover component 475 illustrated in FIG. 4C or by one or more components of a auto admin instance 350 (e.g., partition management scheduler 420, which may include a sweeper component/module and/or an event scheduler component/module).

In some embodiments that include multiple computing nodes 1600, all of the computing nodes 1600 may include the same or similar hardware components, software components, and functionality, while in other embodiments the computing nodes 1600 comprising a computing system configured to implement the functionality described herein may include a wide variety of hardware components, software components, and functionality. In some embodiments, multiple computing nodes 1600 that collectively implement a data storage service may be components of a larger shared resource system or grid computing system. It is noted that different elements of the system described herein may be implemented by different computing nodes 1600. For example, a computer system that supports the functionality described herein for managing service requests may be implemented on the same computing node 1600 on which a client (through which a customer or subscriber may access the system) executes, or on another computing node 1600, in different embodiments. In another example, different subsystems (e.g., a Web service interface, an admission control subsystem, and a service request subsystem; and/or one or more Web servers or other components) may be implemented on or across multiple ones of the computing nodes, and each of the computing nodes may be similar to computing node 1600.

In the illustrated embodiment, computing node 1600 includes one or more processors 1610 coupled to a system memory 1620 via an input/output (I/O) interface 1630. Computing node 1600 further includes a network interface

1640 coupled to I/O interface 1630, and one or more input/output devices 1650. As noted above, in some embodiments, a given node may implement the functionality of more than one component of a system that manages and maintains data in tables and in various partitions thereof (e.g., in a non-relational database) on behalf of data storage service clients, such as that described herein. In various embodiments, a computing node 1600 may be a uniprocessor system including one processor 1610, or a multiprocessor system including several processors 1610 (e.g., two, four, eight, or another suitable number). Processors 1610 may be any suitable processor capable of executing instructions. For example, in various embodiments processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. Similarly, in a distributed computing system such as one that collectively implements a data storage service, each of the computing nodes may implement the same ISA, or individual computing nodes and/or replica groups of nodes may implement different ISAs.

In some embodiments, system memory 1620 may include a non-transitory, computer-readable storage medium configured to store program instructions and/or data (shown as program instructions 1625 and data store 1635, respectively) that are accessible by processor(s) 1610. In various embodiments, system memory 1620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, methods or techniques (such as functionality for identifying, prioritizing and/or scheduling various partition management operations using any or all of the mechanisms described herein), are shown stored within system memory 1620 as code 1625. For example, program instruction 1625 may include program instructions that when executed on processor(s) 1610 implement any or all of a storage service client 310, a front end module 340 (which may include a user interface), an auto admin instance 350, a storage node instance 360, an admin console 465, a partition management partition management scheduler 420, a request router, a staging host, one or more metadata tables, an external workflow component 370, and/or any other components, modules, or sub-modules of a system that provides the data storage system and services described herein. Program instructions 1625 may also include program instructions configured to implement additional functionality of a system that implements a data storage service not described herein.

It is noted that in some embodiments, code 1625 may include instructions and data implementing desired functions that are not directly executable by processor 1610 but are represented or encoded in an abstract form that is translatable to instructions that are directly executable by processor 1610. For example, code 1625 may include instructions specified in an ISA that may be emulated by processor 1610, or by other code 1625 executable on processor 1610. Alternatively, code 1625 may include instructions, procedures or statements implemented in an abstract programming language that may be compiled or interpreted in the course of execution. As non-limiting examples, code 1625 may include code specified in a procedural or object-oriented programming language such as C or C++, a scripting language such as perl, a markup language such as HTML or XML, or any other suitable language.

Data storage 1635 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource usage data, provisioned resource utilization data, parameter values for various partition management policies, limits, or constraints, and/or information about candidate partition management operations).

In other embodiments, program instructions and/or data as described herein for implementing a data storage service that employs the techniques described above may be received, sent or stored upon different types of computer-readable media or on similar media separate from system memory 1620 or computing node 1600. Generally speaking, a computer-readable medium may include storage media or memory media such as magnetic or optical media, e.g., disk or CD/DVD-ROM coupled to computing node 1600 via I/O interface 1630. Program instructions and data stored on a computer-readable storage medium may be transmitted to a computing node 1600 for execution by a processor 1610a by transmission media or signals such as electrical, electromagnetic, or digital signals, which may be conveyed via a communication medium such as a network and/or a wireless link, such as may be implemented via network interface 1640.

In one embodiment, I/O interface 1630 may be configured to coordinate I/O traffic between processor(s) 1610, system memory 1620, and any peripheral devices in the computing node, including network interface 1640 or other peripheral interfaces, such as input/output devices 1650. In some embodiments, I/O interface 1630 may perform any necessary protocol, timing or other data transformations to convert data signals from one component (e.g., system memory 1620) into a format suitable for use by another component (e.g., processor 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments some or all of the functionality of I/O interface 1630, such as an interface to system memory 1620, may be incorporated directly into processor 1610.

Network interface 1640 may be configured to allow data to be exchanged between computing node 1600 and other devices attached to a network (such as other computer systems, communication devices, input/output devices, or external storage devices), or between other nodes in a system providing shared computing services. In various embodiments, network interface 1640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1650 may, in some embodiments, include one or more display terminals, keyboards, keypads, touchpads, scanning devices, voice or optical recognition devices, or any other devices suitable for entering or retrieving data by one or more computing nodes 1600. Multiple input/output devices 1650 may be present in computing node 1600 or may be distributed on various computing nodes of a system that is configured to implement a data storage service. In some embodiments, similar input/output devices may be separate from computing node 1600 and may interact with one or more computing nodes of a system through a wired or wireless connection, such as over network interface 1640.

Storage service clients (e.g., users, subscribers and/or client applications) may interact with a data storage service such as that described herein in various ways in different embodiments, such as to submit requests for service (including, but not limited to, requests to store, retrieve and/or update items in tables, or requests to split, move, or otherwise repartition a table), and to receive results. For example, some subscribers to the service may have physical access to computing node 1600, and if so, may interact with various input/output devices 1650 to provide and/or receive information. Alternatively, other clients/users may use client computing systems to access the system, such as remotely via network interface 1640 (e.g., via the Internet and/or the World Wide Web). In addition, some or all of the computing nodes of a system providing the service may provide various feedback or other general types of information to clients/users (e.g., in response to user requests) via one or more input/output devices 1650.

Those skilled in the art will appreciate that computing node 1600 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1600 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1600 may be transmitted to computing node 1600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the non-relational data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Although the embodiments above have been described in considerable detail, numerous variations and modifications will become apparent to those skilled in the art once the above disclosure is fully appreciated. Accordingly, various modifications and changes may be made as would be obvious to a person skilled in the art having the benefit of this disclosure. It is intended that the following claims be interpreted to embrace all such modifications and changes and, accordingly, the above description to be regarded in an illustrative rather than a restrictive sense.

The invention claimed is:

1. A system, comprising:
   one or more processors;
   a memory coupled to the one or more processors; and
   a plurality of storage nodes, each of which comprises one or more storage devices or logical storage volumes;

wherein the memory stores program instructions that when executed by the one or more processors cause the one or more processors to implement a distributed database service;

wherein the distributed database service maintains data in two or more partitions, and wherein to maintain the data in the two or more partitions, the distributed database service is configured to store two or more replicas of each of the two or more partitions on respective storage devices or logical storage volumes of respective ones of the plurality of storage nodes;

wherein multiple storage nodes of the plurality of storage nodes are configured to:
    identify one or more candidate partition management operations to be performed on the storage node, wherein each of the candidate partition management operations comprises a split operation targeting a partition replica that is stored on a storage device or logical volume of the storage node or a move operation targeting one or more partition replicas that are stored on a storage device or logical volume of the storage node; and
    send information about each of the one or more candidate partition management operations to a central partition management scheduler of the distributed database service, wherein for each of the candidate partition management operations, the information comprises an indication of whether the candidate partition management operation comprises a split operation or a move operation, an indication of a number of replicas to be affected by the candidate partition management operation, or an indication of an amount of a resource that is provisioned for replicas affected by the candidate partition management operation; and wherein the central partition management scheduler of the distributed database service is configured to:
    receive the information about the one or more candidate partition management operations from the multiple storage nodes; and
    apply a global prioritization across the candidate partition management operations to be performed on the multiple storage nodes, wherein to apply the global prioritization the central partition management scheduler is configured to determine an order in which at least some of the candidate partition management operations across the multiple nodes are to be performed based, at least in part, on the received information.

2. The system of claim 1, wherein to determine an order, the central partition management scheduler is configured to prioritize candidate partition management operations for which the received information indicates that the operation comprises a split operation over any candidate partition management operations for which the received information indicates that the operation comprises a move operation.

3. The system of claim 1,
wherein for each of the candidate partition management operations for which the received information indicates that the operation comprises a move operation, the received information further indicates whether the one or more partition replicas are to be moved to reduce the amount of provisioned storage capacity on a storage device or logical volume of the storage node or to reduce an amount of provisioned throughput capacity on a storage device or logical volume of the storage node; and wherein to determine an order, the central partition management scheduler is configured to prioritize candidate partition management operations for which the received information indicates that the operation comprises a move operation to reduce the amount of provisioned storage capacity on a storage device or logical volume over any candidate partition management operations for which the received information indicates that the operation comprises a move operation to reduce an amount of provisioned throughput capacity on a storage device or logical volume.

4. The system of claim 1, wherein to identify the one or more candidate partition management operations, each of the multiple storage nodes is configured to:
    determine one or more measurements of storage capacity utilization or throughput capacity utilization on the one or more storage devices or logical storage volumes of the storage node;
    determine, based at least in part on the determined measurements, that one or more partition replicas should be moved from a given one of the storage devices or logical storage volumes to one or more different storage devices or logical storage volumes to reduce the storage capacity utilization or the throughput capacity utilization on the given one of the storage devices or logical storage volumes;
    apply two or more algorithms to the one or more measurements to identify the one or more partition replicas that should be moved, each of which yields a respective partition management solution; and
    identify one of the partition management solutions as a candidate partition management operation.

5. The system of claim 1,
wherein the central partition management scheduler is further configured to send a query to the each of the multiple storage nodes; and
wherein at least one of identifying the one or more candidate partition management operations or sending information about each of the one or more candidate partition management operations is performed in response to the query.

6. A method, comprising:
performing by one or more computers:
    obtaining, from a plurality of storage nodes of a distributed data storage system, information about each of a plurality of candidate partition management operations to be performed on the plurality of storage nodes of the distributed data storage system, wherein the distributed data storage system stores data in two or more partitions on respective storage devices or logical storage volumes of the plurality of storage nodes, and wherein for each of the candidate partition management operations, the information comprises an indication of a partition management operation type, wherein the partition management operation type specifies whether the candidate partition management operation comprises a split type operation or a move type operation;
    applying a global prioritization across the plurality of candidate partition management operations to be performed on the plurality of storage nodes, wherein said applying the global prioritization comprises determining an order in which to perform the plurality of candidate partition management operations across the plurality of storage nodes based, at least in part, on the partition management operation types of the plurality of candidate partition management operations.

7. The method of claim 6, wherein said obtaining comprises receiving the information from the plurality of storage nodes.

8. The method of claim 6, wherein said obtaining comprises scanning a database table or data structure in which the information about each of the plurality of candidate partition management operations is stored.

9. The method of claim 6, wherein said determining comprises selecting a first candidate partition management operation to be performed based, at least in part, on the partition management operation type for the first candidate partition management operation.

10. The method of claim 9, wherein said determining further comprises:
  determining that a pre-determined constraint limiting performance of additional partition management operations has not been met; and
  in response to determining that the pre-determined constraint limiting performance of additional partition management operations has not been met, selecting a second candidate partition management operation to be performed while the first candidate partition management operation is in progress.

11. The method of claim 6, wherein said obtaining comprises:
  receiving information indicating storage capacity utilization or throughput capacity utilization on one or more storage devices or logical storage volumes of each of the plurality of storage nodes; and
  identifying a plurality of candidate partition management operations to be performed on the plurality of storage nodes based, at least in part, on the information indicating storage capacity utilization or throughput capacity utilization.

12. The method of claim 6, wherein said determining an order in which to perform the plurality of candidate partition management operations is based, at least in part, on a number of partitions affected by at least some of the plurality of candidate partition management operations.

13. The method of claim 6, wherein said determining an order in which to perform the plurality of candidate partition management operations is based, at least in part, on an amount of provisioned resources affected by at least some of the plurality of candidate partition management operations.

14. The method of claim 6, wherein said determining an order in which to perform the plurality of candidate partition management operations is based, at least in part, on determining that a given one of the plurality of candidate partition management operations does not conflict with any partition management operations that are in progress.

15. A non-transitory, computer-readable storage medium storing program instructions that when executed on one or more computers cause the one or more computers to perform:
  receiving, from a plurality of storage nodes, information about each of a plurality of candidate partition management operations to be performed on the plurality of storage nodes on which database partitions are stored on one or more storage devices or logical storage volumes based, at least in part, on the received information; and
  applying a global prioritization across the plurality of candidate partition management operations to be performed on the plurality of storage nodes, wherein said applying the global prioritization comprises determining an order in which to perform at least some of the candidate partition management operations across the plurality of storage nodes based, at least on part, on a number of partitions affected by the at least some of the candidate partition management operations or on an amount of provisioned resources affected by at least some of the candidate partition management operations.

16. The non-transitory, computer-readable storage medium of claim 15, wherein said determining an order comprises identifying two or more of the plurality of candidate partition management operations that can be performed substantially concurrently.

17. The non-transitory, computer-readable storage medium of claim 15, wherein said determining an order comprises identifying two or more of the plurality of candidate partition management operations to be performed substantially concurrently, wherein the total number of partitions affected by the two or more candidate partition management operations is less than a pre-determined limit on the number of partitions that can be involved in partition management operations at any given time.

18. The non-transitory, computer-readable storage medium of claim 15,
  wherein said identifying comprises storing information about each of the plurality of candidate partition management operations in a database table on one of the plurality of storage nodes; and
  wherein said determining an order comprises applying one or more global prioritization policies to the information about each of the plurality of candidate partition management operations in a database table.

19. The non-transitory, computer-readable storage medium of claim 15, wherein when executed on the one or more computers, the program instructions cause the one or more computers to perform, prior to said receiving, provisioning resource capacity for a database table, wherein said provisioning comprises dividing the provisioned resource capacity among two or more partitions of the database table.

20. The non-transitory, computer-readable storage medium of claim 15, wherein each of the plurality of candidate partition management operations comprises one or more partition moving or partition splitting operations that if performed would reduce a provisioned resource on one of the plurality of storage devices or logical storage volumes on which database partitions are stored by at least a pre-determined target amount.

* * * * *